United States Patent
Wyatt et al.

(10) Patent No.: US 7,092,855 B2
(45) Date of Patent: Aug. 15, 2006

(54) THERMO-STABLE COATING DIE DESIGN METHOD AND APPARATUS

(75) Inventors: Mark James Wyatt, Chino Hills, CA (US); Erik Martin Pedersen, Sierra Madre, CA (US); Luigi Sartor, Pasadena, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/449,308

(22) Filed: May 30, 2003

(65) Prior Publication Data

US 2004/0241327 A1    Dec. 2, 2004

(51) Int. Cl.
  *G06F 17/50* (2006.01)
  *B05D 3/12* (2006.01)
(52) U.S. Cl. .............. 703/1; 703/2; 118/410; 118/688; 118/712
(58) Field of Classification Search .......... 703/1–2, 703/7, 9; 118/410–416, 688, 712
  See application file for complete search history.

(56) References Cited

U.S. PATENT DOCUMENTS

| | | | |
|---|---|---|---|
| 3,920,365 A | 11/1975 | Mules | |
| 4,332,543 A | 6/1982 | Fulton et al. | |
| 4,765,941 A | 8/1988 | Anthony, Jr. et al. | |
| 5,494,518 A | 2/1996 | Keane et al. | |
| 5,656,116 A | 8/1997 | Soltysiak | |
| 5,728,430 A | 3/1998 | Sartor et al. | |
| 5,871,585 A | 2/1999 | Most et al. | |
| 5,894,994 A | 4/1999 | Keane et al. | |
| 6,152,720 A | 11/2000 | Greb et al. | |
| 6,482,339 B1 | 11/2002 | Greb et al. | |
| 6,495,196 B1 | 12/2002 | Innes et al. | |

FOREIGN PATENT DOCUMENTS

| CH | 648 497 A5 | 3/1985 |
|---|---|---|
| WO | WO 96/15857 | 5/1996 |

OTHER PUBLICATIONS

Baloch et al, "Simulation of Pressure- and Tube- Tooling Wire-Coating Flows Through Distributed Computation," International Journal of Numerical Methods for Heat & Flow, vol. 12 No. 4, pp. 458-493 (2002).*

(Continued)

*Primary Examiner*—Thai Phan
(74) *Attorney, Agent, or Firm*—Christie, Parker & Hale, LLP

(57) ABSTRACT

A method of designing and the resulting thermally stable heated coating die apparatus, the die apparatus including a die having a die geometry and a heating system with heaters and temperature sensors. The method and resultant apparatus provides minimized temperature gradients, flat die lip faces in a die to roll plane and a flat die in a plane perpendicular to die flat lip faces and parallel to substrate width. The method optimizes simultaneously: die geometry, placement of the heaters, placement of temperature sensors, and shielding from operating conditions, using heat transfer and structural numerical modeling and statistical analysis while considering die functionality characteristics, minimum increment of temperature measurement and control accuracy related to minimum acceptable deviation from flatness, coating die material of construction relative to thermo-structural material properties, and desirable coating die material properties.

54 Claims, 20 Drawing Sheets

OTHER PUBLICATIONS

Carvalho et al, "Low-flow in Slot Coating: Theory and Experiments," American Institute of Chemical Engineers, AIChE Journal, vol. 46 No. 10, pp. 1907-1917 (Oct. 2000).*

Weiss et al, "Simulation Software in Action: Five Users Share Their Experiences," Modern Casting, vol. 89 No. 5, pp. 41-43 (May 1999).*

Feng, "Computational Analysis of Slot Coating on a Tensioned Web," American Institute of Chemical Engineers, AIChE Journal, vol. 44 No. 10, pp. 1907-1917 (Oct. 1998).*

PCT International Search Report dated Nov. 15, 2004 for PCT/US2004/017239.

Written Opinion dated Nov. 15, 2004 for PCT/US2004/017239.

* cited by examiner

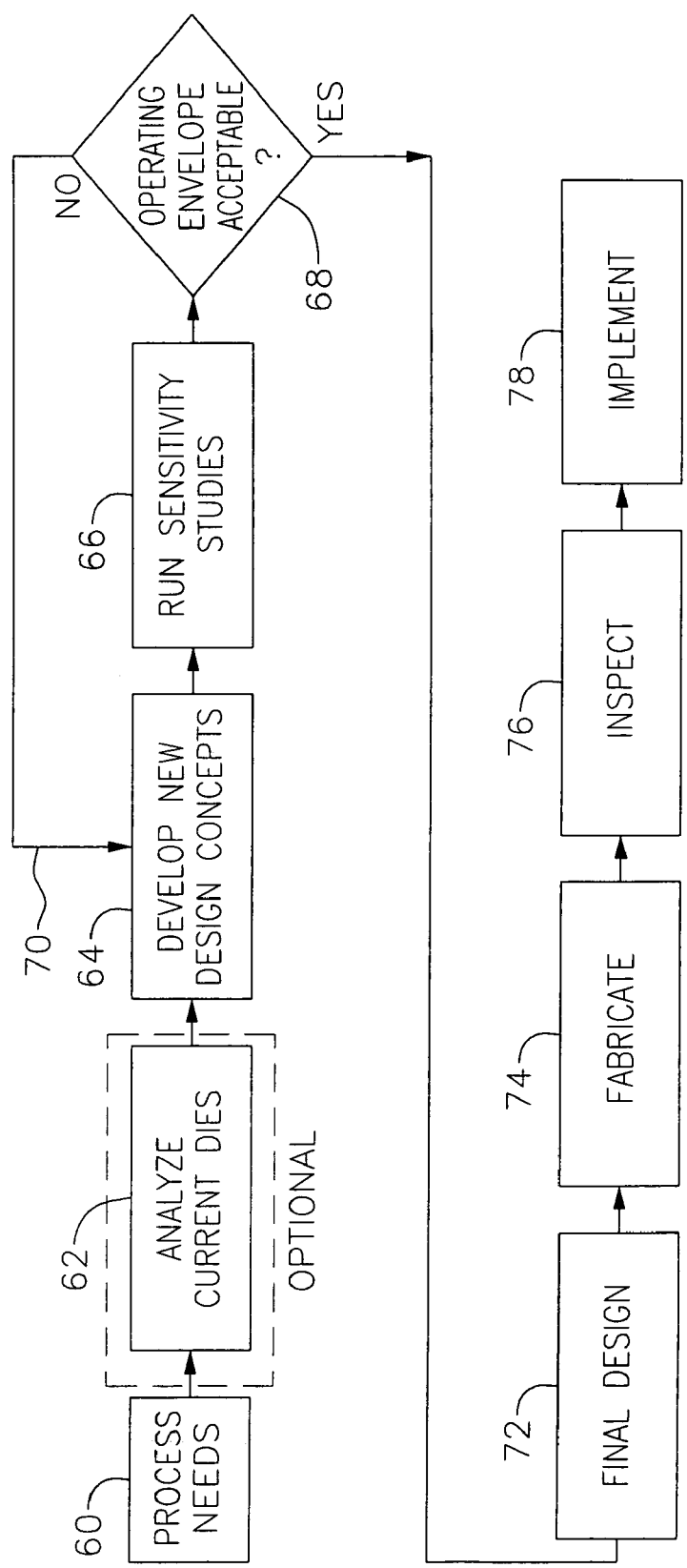

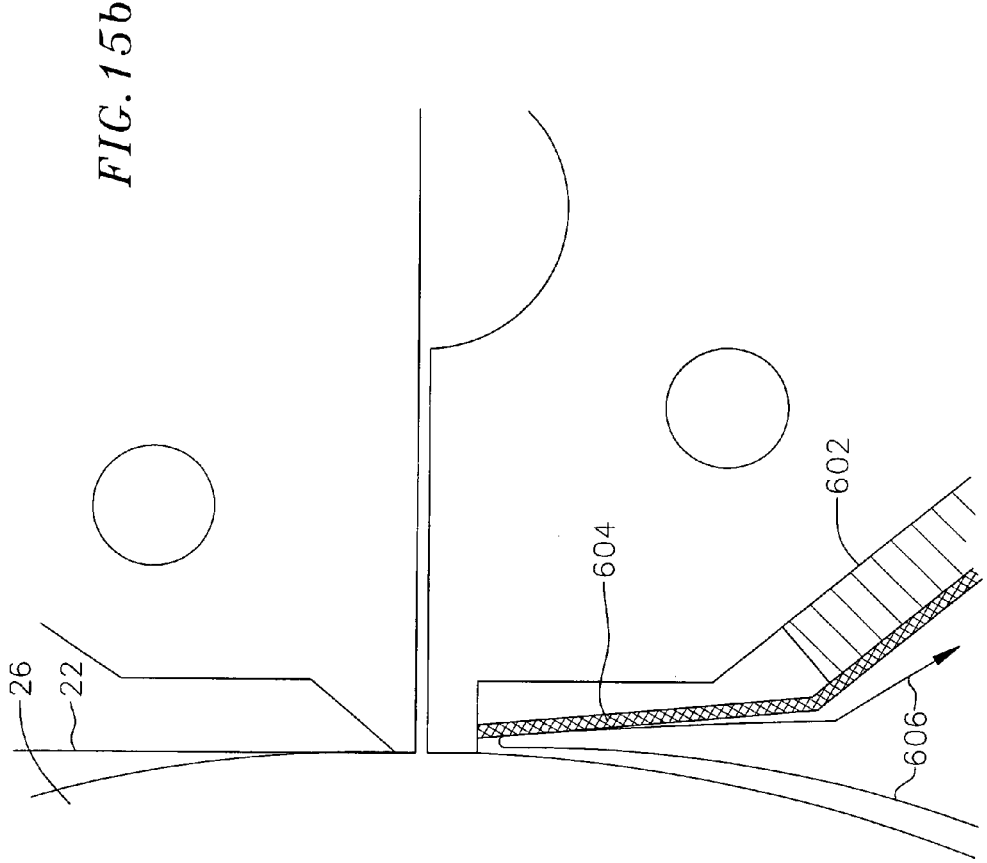

THERMO-STABLE COATING DIE DESIGN METHOD AND APPARATUS

BACKGROUND OF THE INVENTION

The present invention relates to the field of coating dies and, in particular, to a methodology for the design of heated coating dies which are capable of maintaining dimensional flatness of its coating lips at operating temperature under actual operating conditions.

A heated coating die is typically used to coat molten polymer containing materials, such as adhesives and other coatings (collectively "coatings"). These coatings are fed into the coating die, which distributes them across its width. Pressure forces the coating fluid through a feed gap formed in the die. The exiting point of the gap is referred to as the coating lips. In many coating applications, the lip faces form a film on the substrate at the lip faces. This film forming region is referred to as the coating bead. In order for the final coating to be uniform across the width of the coating lips (and thus the coating), the coating lips and substrate need to form an even gap (assuming the distribution within the die is uniform).

Lip face flatness measurements on commercially available heated coating dies indicate that the lip surfaces when heated are far from flat. Though the coating lips may be ground to better than 0.001" when cold, the state of the die when heated can be bent several thousandths of an inch. This does not lend itself to a robust coating process. Three known methods of managing the bending state are:

(1) Attempt to bend the die in the opposite direction mechanically, typically by using adjustments associated with the die station.

(2) Machining the coating lips flat while the die is heated as part of the fabrication of the die.

(3) Pushing the coating lips and substrate into a soft rubber roller, then use feed gap adjustments to redistribute the coating fluid to counteract the uneven flow resistances across the lip.

Though all these methods are in use, none of them lead to a sufficiently controlled and robust process.

In the first method, the loss of precision in the die is transferred via mechanical forces to another device (i.e., die station), which then loses its precision. Additionally, internal stresses which cause the bending are not eliminated, but rather shifted. Finally, once coating starts, the bending state can change due to interaction of the die's heating system and the flow of coating fluid, making the initial adjustment ineffective.

The second method also develops problems. First, even if the die can be machined while heated, when the die is cold it will be bent in the opposite direction which creates uncertainties in its mounting to the die station. Additionally, once coating starts, the bending state may change leading to the machined surface no longer being flat. Further, there is uncertainty as to how flat a die can be machined while hot.

The third method is highly non-linear and can lead to long unstable start-ups of the production line. It can also lead to defects in the coating, which may not be discovered in a timely manner.

All three of these methods suffer from the difficulty in determining the initial hot gap between the coating lips and substrate. In a common methodology a light is shone through the gap between the lip face and substrate (or back-up roll), and the die is visually adjusted to be parallel. If the evenness of this gap changes significantly at start-up due to the interaction of the heating system and flow of coating fluid leading to a temperature redistribution within the die and thus the bending state changing, another uncertainty is thereby added to the process.

A need therefore exists for a robust, quick start-up coating process, which is stable before and during coating, and in which the bending state is controllable. The present invention provides a solution to meet such need.

SUMMARY OF THE INVENTION

In accordance with the present invention a method is provided for designing the die geometry, its heating system and temperature sensors location in such a way that the normal state of the coating lips is flat (whether hot or cold, whether coating or not). Further, in accordance with the present invention exemplary die apparatus implementing such design method is provided. Accordingly, non-precise methods of mechanically adjusting bending and uncertain machining methods become not needed and the confounding of the bending state with other variables affecting coat weight variation is eliminated.

In accordance with the present invention a coating die apparatus is provided which includes:

a die having a rear portion, a width and at least two coating lips at a front portion distal from the rear portion, the at least two coating lips spanning across the width and adapted to provide at least one coating gap between the at least two coating lips and a substrate upon which a fluid layer is applied onto the substrate from between the two coating lips and across the width; and an integrated heating system coupled to the die to monitor and control temperature in such a way as to minimize temperature gradients both across the width (cross-width) and front to back and top to bottom (cross-section).

The integrated heating system can further include groups of cross-width heaters spaced within the die in back portion to front portion direction and/or front portion to back portion direction, across the width in zones. Each zone has a respective cross-width temperature sensor. Each cross-width temperature sensor is coupled to a respective cross-width temperature control system to regulate heat being applied by the respective cross-width heaters in the respective zone.

The integrated heating system can further include one or more cross-section heaters spaced within the die longitudinally across the width. Each cross-section heater has a respective cross-section temperature sensor. Each cross-section temperature sensor is coupled to a cross-section temperature control system to regulate the heat being applied by the respective cross-section heaters.

In accordance with the present invention, a thermally stable coating die may contain a heating system composed of cartridge heaters and temperature sensors for heating control, and is designed to maintain its dimensional flatness to within specified tolerances in Y-Z and X-Z planes by minimizing temperature gradients across the width in the X-Y plane and/or compensating where gradients are difficult to remove by creating counter-balanced temperature gradients. Flatness of the die may be purposefully altered by unbalancing the heating system in a controlled manner. Heater and temperature sensor placement are optimally determined using finite element modeling and/or measurement and/or other methodology to calculate and/or determine temperatures and/or temperature-distribution and/or the resulting thermal distortions in the die and utilizing an optimization procedure. Heat flux, stress, or strain measurement techniques or sensors, as well as statistical analysis can be utilized.

The heated (or unheated) die to which the present invention can be applied consists normally of 2 to 3 sections. In the case of two sections, a single feed gap is created, producing a single layer coating. In the case of a three section die, two feed gaps are created producing a two layered coating. Those skilled in the art can appreciate that potentially multiple layers could be added.

The geometry of the die, the heater placement and temperature sensor placement are optimized in such a way that upon heating, the intrinsic state of the die results in the lip faces being flat relative to the substrate. This is accomplished by first simplifying the die geometry, removing unneeded material (usually steel) which leads to hot/cold spots. Next, the geometry of the die is designed in such a way that all portions of the die which remain are amenable to being heated and/or insulated from heat loss and temperature monitored. Next, heaters are placed in such a manner as to allow uniform heating of the entire die. Next, temperature sensors are placed in locations which accurately indicate the temperature state of the heater zones which they monitor. All the above may be verified and optimized by calculation using a numerical heat transfer model. The thermal deformation can be estimated by mapping the temperature results onto a numerical structural model. The thermal and structural models are run to account for process variations—fluid flowing through the die, no fluid flowing, etc. Once all the parameters (die geometry, heater placement, temperature sensor placement) are optimized and a design has been developed iteratively, the die is fabricated. Note that in addition to the thermal and structural requirements any changes to die geometry need to occur within a design window which leads to a die which is still functional to its intended purpose (i.e., coating a fluid onto a substrate). After fabrication and verification of flat lip faces when the die is cold, the die is heated and flatness of the lip faces are measured hot. Small changes to temperature setpoints are made to adjust the heating system to bring the die flat. These set point offsets may be verified in the die station, and adjusted if needed. The temperature sensors and control system used which can provide the smallest measurable/controllable increment of temperature results in a correspondingly minimum change in bending state.

This invention can also be applied to normally unheated coating dies by locally heating/cooling to control the bending state. Additionally, those skilled in the art can appreciate that the practice of the present invention can be applied to other die types, i.e., extrusion dies, curtain dies, etc.

BRIEF DESCRIPTION OF THE DRAWINGS

FIG. 3 shows in block diagram form the design process in accordance with the present invention.

FIGS. 15a and 15b show in simplified schematic cross-section view a portion of a die apparatus embodiment in accordance with the present invention in conjunction with still further attachments affecting overall temperature of the die.

DETAILED DESCRIPTION

Figure 1A:
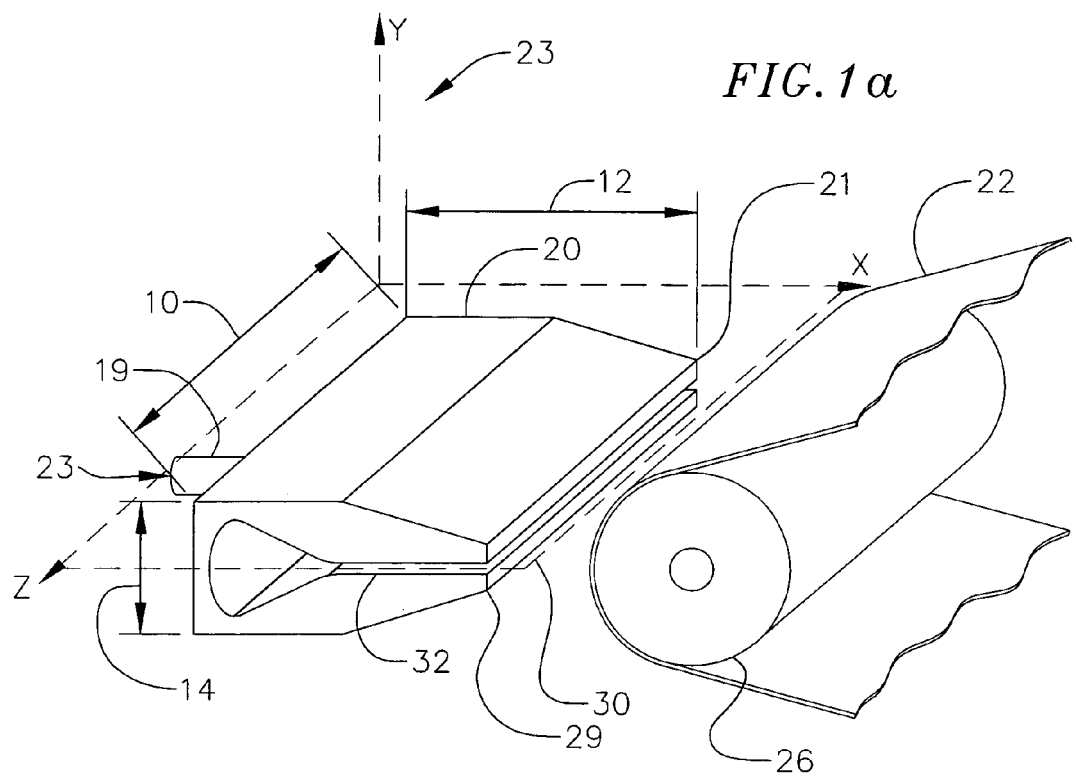
FIG. 1a shows in simplified form a commonly known single layer coating operation.

Referring to FIG. 1a, a commonly known coating technique for a single-layer coating is shown in simplified form. Liquid to be coated in a single layer on the substrate is fed past an elongated slot formed in a die (thus, this technique is also sometimes referred to as "slot coating"). The slot is positioned at approximately a right angle to the direction of travel of the substrate. The die is stationary, but the head of the die, having two coating lips which define the opening of the slot, are placed adjacent to the substrate. A substrate may travel around a back-up roll as it passes in front of the coating lips. The slot formed by the coating lips and the substrate have substantially equal widths, such that the entire cross substrate width of the substrate is coated in one pass by the fluid as it flows out of the die and onto the moving substrate. X, Y, Z coordinate system 23 is indicated to help orient the various parts of the die, wherein the X-Z plane is deemed to pass through the slot formed by the coating lips. The Y-Z and X-Y planes are respectively perpendicular thereto per the typical coordinate system orientation.

Figure 1B:
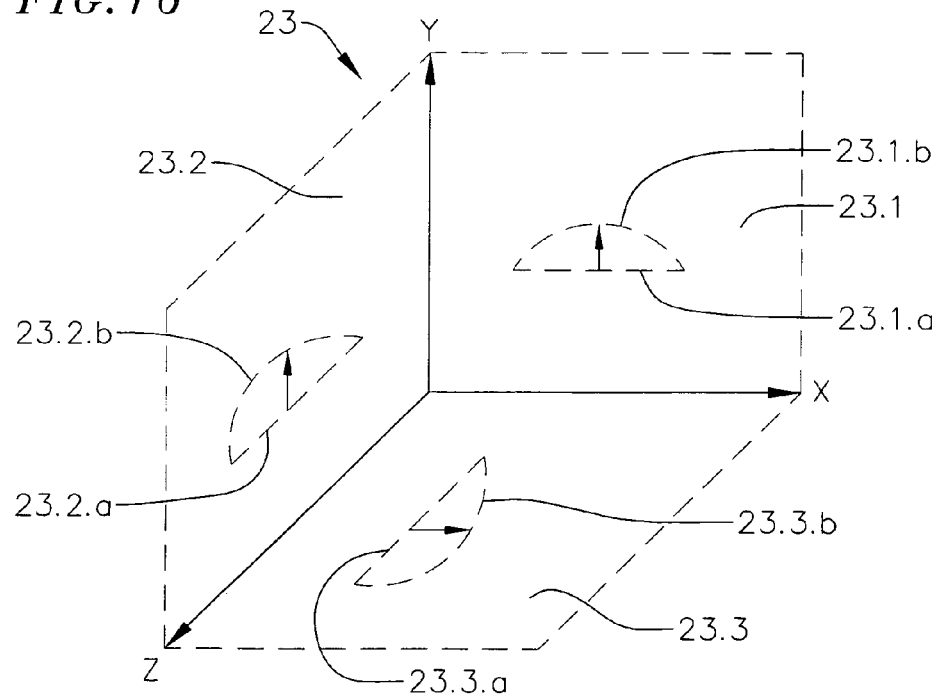
FIG. 1b depicts various planes associated with the implementation of the present invention.

Referring now to FIG. 1b, X, Y, Z coordinate system 23 of FIG. 1b and associated planes formed thereby is now described in more detail. X and Y coordinates form X-Y plane 23.1, Y-Z coordinates for Y-Z plane 23.2. X-Z coordinates for X-Z plane 23.3. Hereinafter, an X-Y plane bending is deemed to be a bending in the X-Y plane from a flatness 23.1.a to a bend 23.1.b; an Y-Z plane bending is deemed to be a bending in the Y-Z plane from a flatness 23.2.a to a bend 23.2.b; and a X-Z plane bending is deemed to be a bending in the X-Z plane from a flatness 23.3.a to a bend 23.3.b. The present invention focuses on the X-Z and Y-Z bending modes.

Not all dies need to be compensated. Dies which are long and thin in at least one dimension will have a tendency to bend in the long planes. Defining a die by its width (or Z-dimension distance 10 in FIG. 1a) to X-dimension distance 12 in FIG. 1a) ratio and/or its width (or Z-dimension distance 10 in FIG. 1a) to Y-dimension distance 14 in FIG.

1a) ratio will characterize the dimensional tendency for bending to be significant in the X-Z and/or Y-Z plane, respectively. Generally dies with the ratio equal to or greater than 2.5 will be considered for compensation in accordance with the present invention. These dimensions are the typical dimension of the structurally important portions of the die. If it is difficult to state a "typical" dimension, then the average dimension should be utilized. This is a geometric consideration. Squares and cubes (e.g., ratio or ratios=1) do not tend to bend much due to restraining stiffnesses. As thermo-physical properties improve, the optimizing job at any given ratio becomes easier. Improved properties for steady state operation include increasing thermal conductivity (watt per meter per degree-Celsius) and reducing coefficient of thermal expansion (meter per meter per degree-Celsius).

If properly designed and adjusted, the die will distribute the liquid evenly and uniformly out of the exit formed by the coating lips in a thin layer. The present invention does not focus on the internal distribution of the fluid in the die. Typically, the die can be adjusted radially to move toward or away from the substrate (in the X direction), thus determining the gap between the coating lips and the substrate, also referred to as the "coating gap." For a given coating thickness, the flow parameters of the liquid can be determined, including the flow rate. Once these parameters are determined and the die is "set" in the coating machine, the coating gap would typically be adjusted during operation. However, because of the extremely thin layers being coated, any such adjustments usually inject a certain degree of imprecision into the process. There are also physical limitations on the accuracy of the die itself. For example, it is very difficult to hold extremely small tolerances on the lip geometries of the die, especially over the width of the slot which may vary between a few and a hundred or more inches.

Figure 2A:
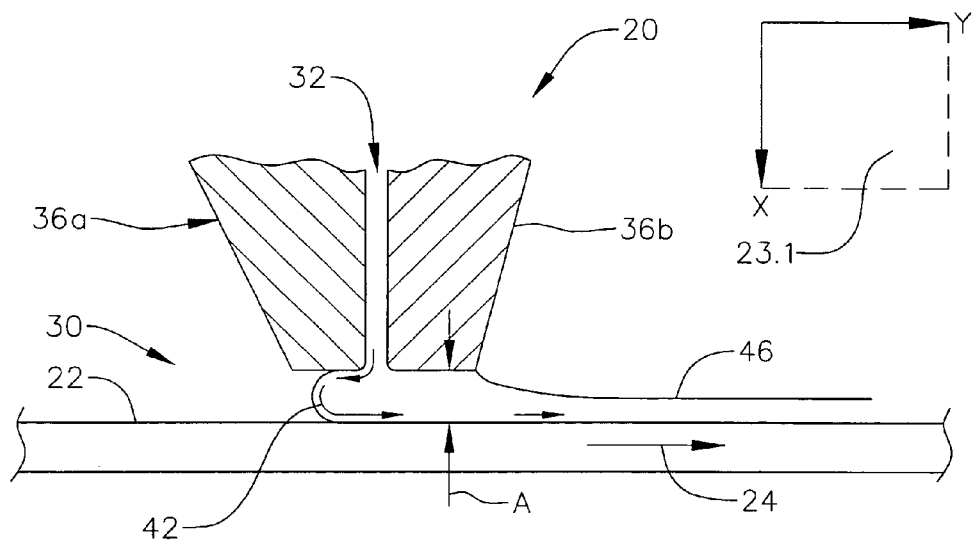
FIGS. 2a and 2b show respectively in simplified form both a single layer and dual layer coating operation.

Referring now to both FIGS. 1a and 2a, there is illustrated schematically a typical die coating operation. Die 20 is shown positioned adjacent to moving substrate 22 traveling in the Y direction 24 in the area of coating lips 36a, 36b. Die 20 is shown simplified without heaters, insulation, or temperature sensors which are typically included with a fully operational die, but are described in more detail hereinafter in accordance with exemplary embodiments of the present invention. Substrate 22 travels around a back-up roll 26 as it passes across the distal end of die 20. As shown in FIG. 1, it will be understood that both die 20 and the substrate 22 have substantially equal widths (in the Z direction), such that most of the entire width of the substrate is coated in one pass by the fluid 23 flowing into and out of the die and onto substrate 22.

Die 20 is modular in that it can be assembled from a number of individual elements and then set in the coater machine (i.e., a die station, not shown) as a mountable device. Each die element may include fluid manifold 19 and a more distal die section 21. The most distal portion of the die section is referred to as coating lips 29, described and illustrated in more detail in connection with FIGS. 2a, 2b.

Die 20 can be moved radially into or away from the back-up roll 26 in order to adjust coating gap 30, which is defined as the distance between coating lips 29 and substrate 22. The elements of die 20 are separated from each other slightly by a slot or feed gap 32 which allows the coating material, i.e., fluid 23, to flow from fluid manifold 19 through feed gap 32 onto moving substrate 22.

Referring to FIG. 2a, there is shown a close-up cross-sectional schematic view taken in an X-Y plane 23.1 through a pair of coating lips 36a, 36b positioned adjacent to moving substrate 22 to form coating gap 30. It will be noted with respect to FIG. 1a that substrate 22 in FIG. 2a is shown to be flat or horizontal, whereas it actually will exhibit some curvature as it conforms to back-up roll 26. However, the configuration shown in FIG. 2a is a good approximation of the fluid mechanics occurring in bead 42 of liquid formed in the coating gap 30 between coating lips 36a, 36b and moving substrate 22.

Coating gap 30 is shown as dimension A in FIG. 2a. It will be understood, that coating gap 30 can vary along the die width in the z direction in accordance with different lip geometries, lip machining defects, angled or beveled lips, adjustments, misalignment, etc.

Figure 2B:
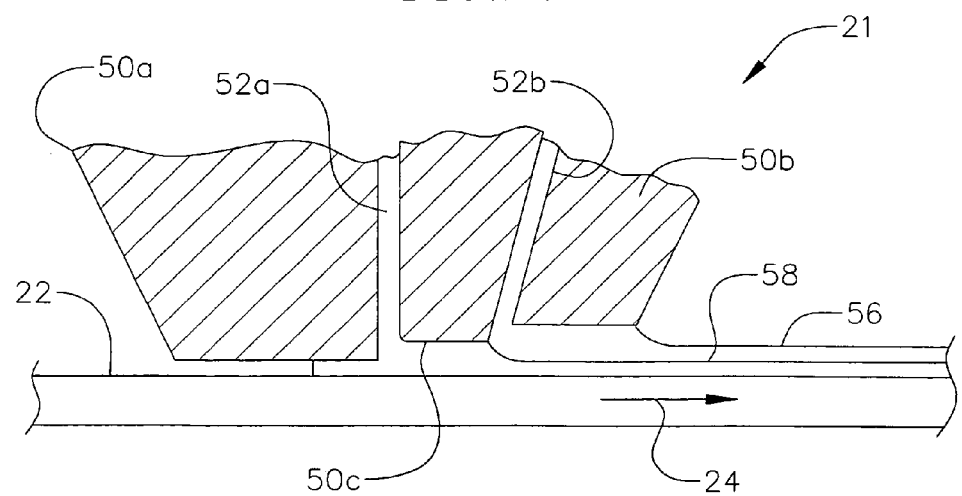

Referring to FIG. 2b, there is shown a close-up cross-sectional view of a multilayer die 21 which may be also utilized in accordance with the present invention. Although similar to die 20 in FIG. 2a, die 21 includes upstream and downstream die sections 50a and 50b, as well as a middle section 50c separating the two. Formed between these various sections are an upstream feed gap 52a and a downstream feed gap 52b. The liquid from upstream feed gap 52a flows onto the substrate 22 to form a bottom layer 58, while the liquid from the downstream feed gap 52b flows onto the bottom layer to form a top layer 56.

The coating gap between the lip face and the substrate becomes critical in providing a uniform layer onto the substrate. Because of the nature of the material of the die, e.g., steel and its operational temperature state, heating a die above atmosphere temperature, unless compensated, will cause non-uniform distortion of a steel die to occur and the coating gap to become uneven over the die and substrate widths.

Figure 8:
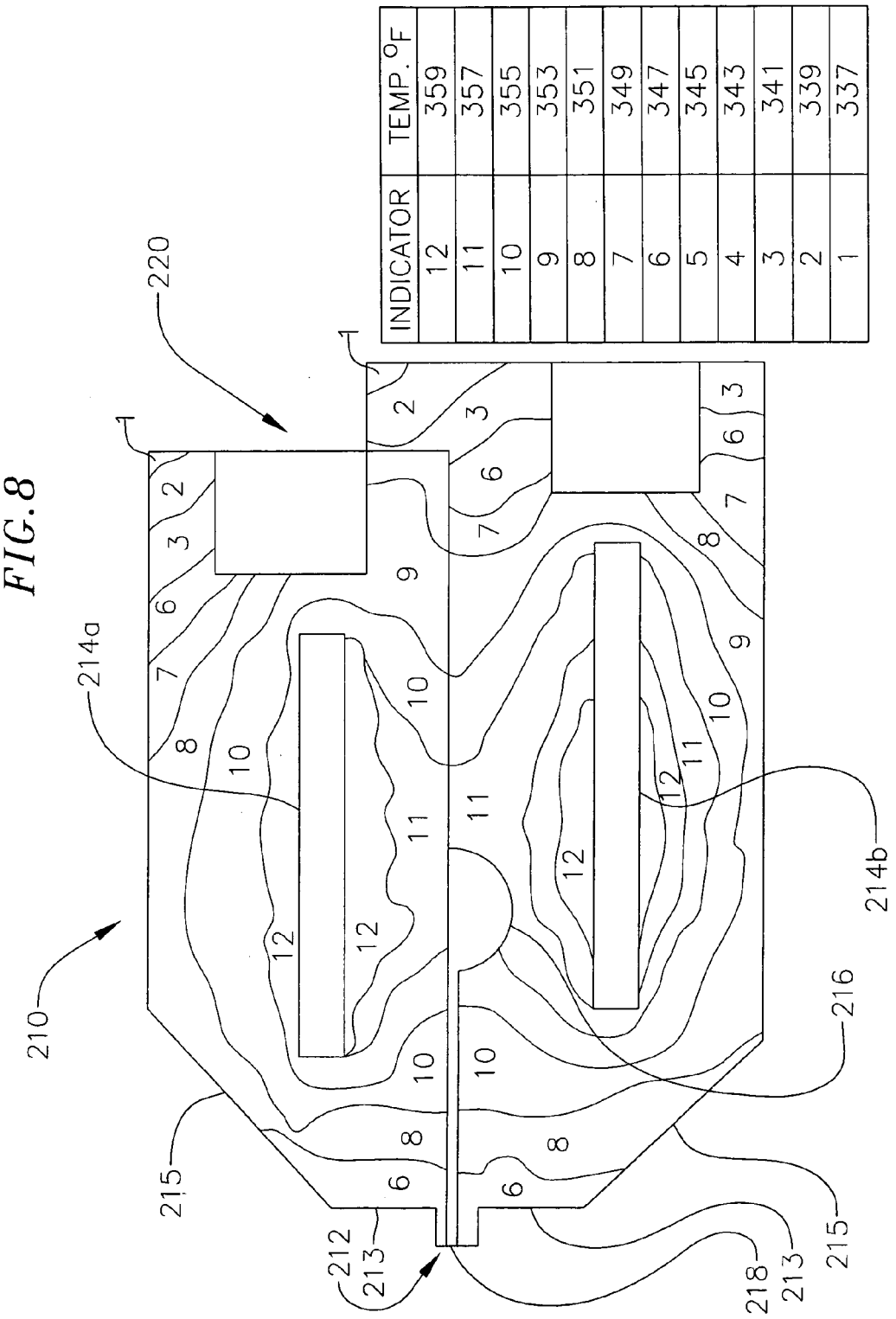
FIG. 8 shows an initial thermal mapping cross section of a die.
Figure 9:
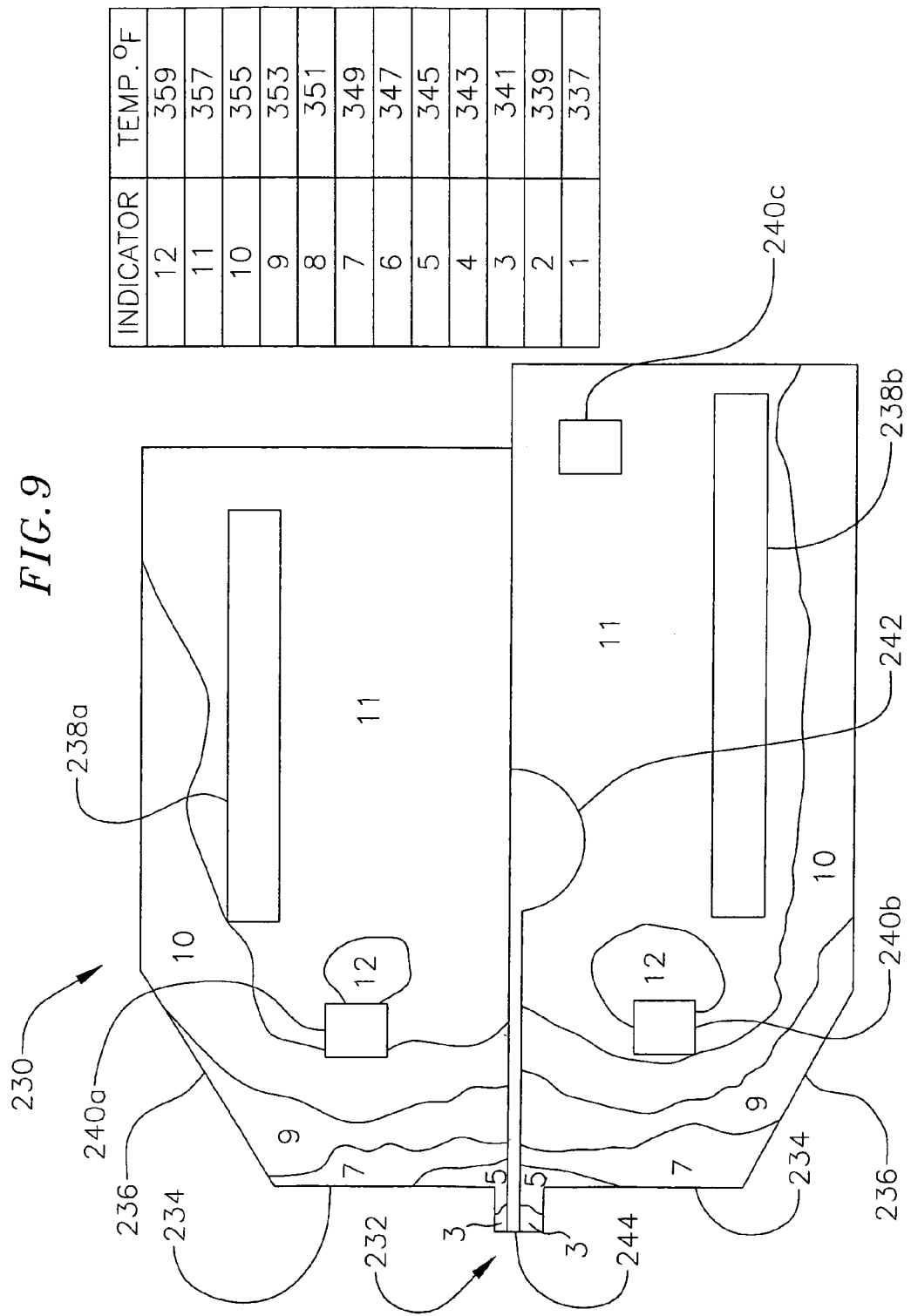
FIG. 9 shows a subsequent thermal mapping cross section of an improved die in accordance with the present invention.

Heat distribution during a coating operation utilizing a known geometrical shape die can be thermally modeled. Referring briefly to FIGS. 8 and 9 temperature distributions can be color displayed utilizing specific computer generated thermal modeling techniques, the color display typically spanning from a hot area (e.g., in practice a red or white color, but indicated in FIGS. 8 and 9 by a higher number in the range of 1–12 temperature segments) to a cold area (e.g., in practice a blue color, but indicated in FIGS. 8 and 9 by a lower number in the range of 1–12 temperature segments). These operational temperature gradients can result from the geometry of the die, the material of the die, the location of heaters of a heating system applied to the die and the accuracy/placement of temperature sensors to control such heaters. Because of the resulting differences in temperature, different parts of the die will expand or contract by different amounts, causing die distortions.

Therefore, a key issue addressed by the present invention is how flat and parallel the lip face is to the substrate across width in the X-Z and Y-Z planes during die operation. Typical single layer dies can provide for one of the pair of coating lips to be a fixed lip section and the other one of the pair of coating lips to be a flexible lip section. The flexible lip section can be mechanically adjusted to provide some assistance to help compensate for small magnitudes of feed gap unevenness. Heat distribution of an assembly of such a fixed/flex die will be such that the fixed and flexible lip portions may distort in different directions with respect to the substrate. This may also occur in a fixed/fixed die. Also, when coating starts, the die begins to be heated differently because the fluid begins to interact with the heating system. This can cause a change in bending state.

By simulating heat addition and loss in the correct amounts in the correct places to the thermal modeled die to remove the temperature gradients, the structural model will verify a thermally corrected die prior to die manufacture which provides a good approximation of a die with a uniform coating gap.

Referring to FIG. 3, a design process flow in accordance with the present invention is established to provide for developing a thermally corrected die which provides such a uniform coating gap. First, a manufacturing plant process need (e.g., for a hot melt die that doesn't bend to distort the coating gap) is established (60). Next, current dies can be (optionally) analyzed, measuring bending under temperature, and providing computer generated models to explain why the bending occurs (62). Then, models are used to create a die (64) that doesn't bend, using the models to show why a die bends by understanding the temperature physics and making compensations therefor to meet process operation objectives (e.g., non-bending die) and parameters (e.g., lips style, size, shape, material). The models provide a basic configuration to start the compensation study process. Next, sensitivity studies are run (66), taking into consideration environmental conditions, type of insulation needed to control heat loss, adhesive flow and airflow patterns around the die. The sensitivity study develops an operating envelope for the die (68), which if not acceptable the die configuration gets adjusted (70) to meet the operating envelope. Once the operating envelope is found acceptable, the details as to die geometry, heater/temperature sensor/insulation types, size and locations are established for the contemplated die (72). A die is then fabricated (74) and inspected (76) hot and cold in accordance with standard drafting and manufacturing processes. If the inspection proves successful the die can be implemented for operation (78).

Figure 4:
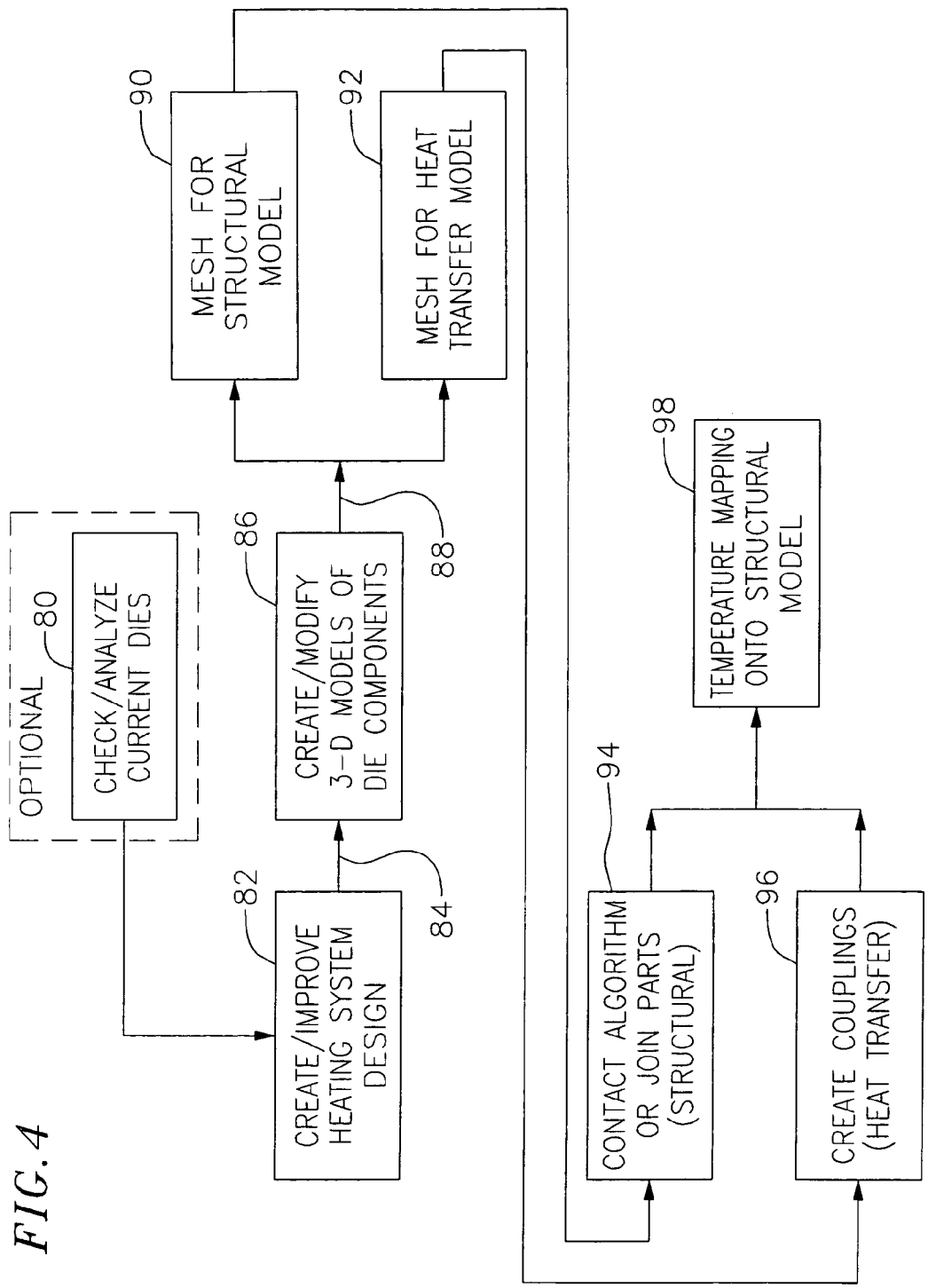
FIG. 4 shows in block diagram form the "develop new design concepts" aspect of the design process in accordance with the present invention.

Referring to FIG. 4, the "develop new design concepts" (64) of FIG. 3 is set forth in further detail. First, current dies can be (optionally) checked and analyzed (80). Then, if current designs do not meet desired coating gap objectives a new and/or improved heating system design is considered (82), taking into consideration design requirements and limitations (e.g., die size/shape geometrical window in which the die will operate, material properties) and available technology. This results in a preliminary design (84). Once the preliminary design is established, a three dimensional model (88) of the die components (e.g., top half, bottom half, coating lips), which can influence heat transfer in the die and its thermal map (temperature vs. spatial location), is created (86). From the solid model, a finite element meshing routine is used to create a mesh for the structural model (90) and a mesh for the heat transfer model (92). The parts (top, bottom, lips) are joined (94) and the heat transfer model is run (96). The temperatures are then mapped onto the solid structural model (98) to determine the resulting deformation.

Figure 5:
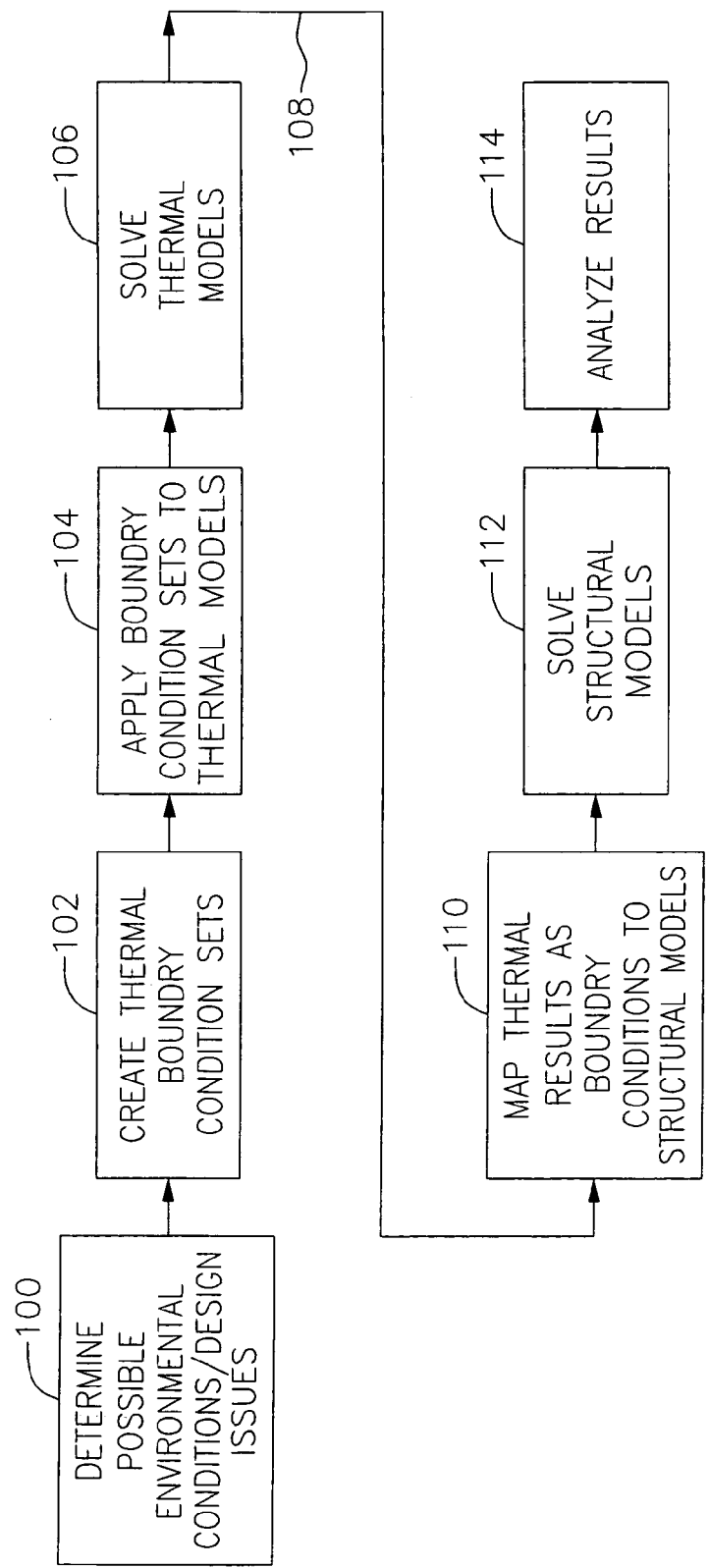
FIG. 5 shows in block diagram form the "run sensitivity studies" aspect of the design process in accordance with the present invention.

Referring now to FIG. 5, the "run-sensitivity-studies" (66) of FIG. 3 is set forth in further detail. First, possible environmental conditions and design issues are determined (100). Then, boundary conditions are set (102), such as amount airflow around the die, amount of fluid flowing. The boundary conditions sets are then applied to the thermal models (104). The thermal models are then solved (106) providing a three-dimensional temperature map of each condition (108).

The temperature map is then mapped onto a structural model (110). The structural model is then solved to determine the deformation (112). The results are then analyzed (114) to determine if the design is acceptable.

Figure 6:
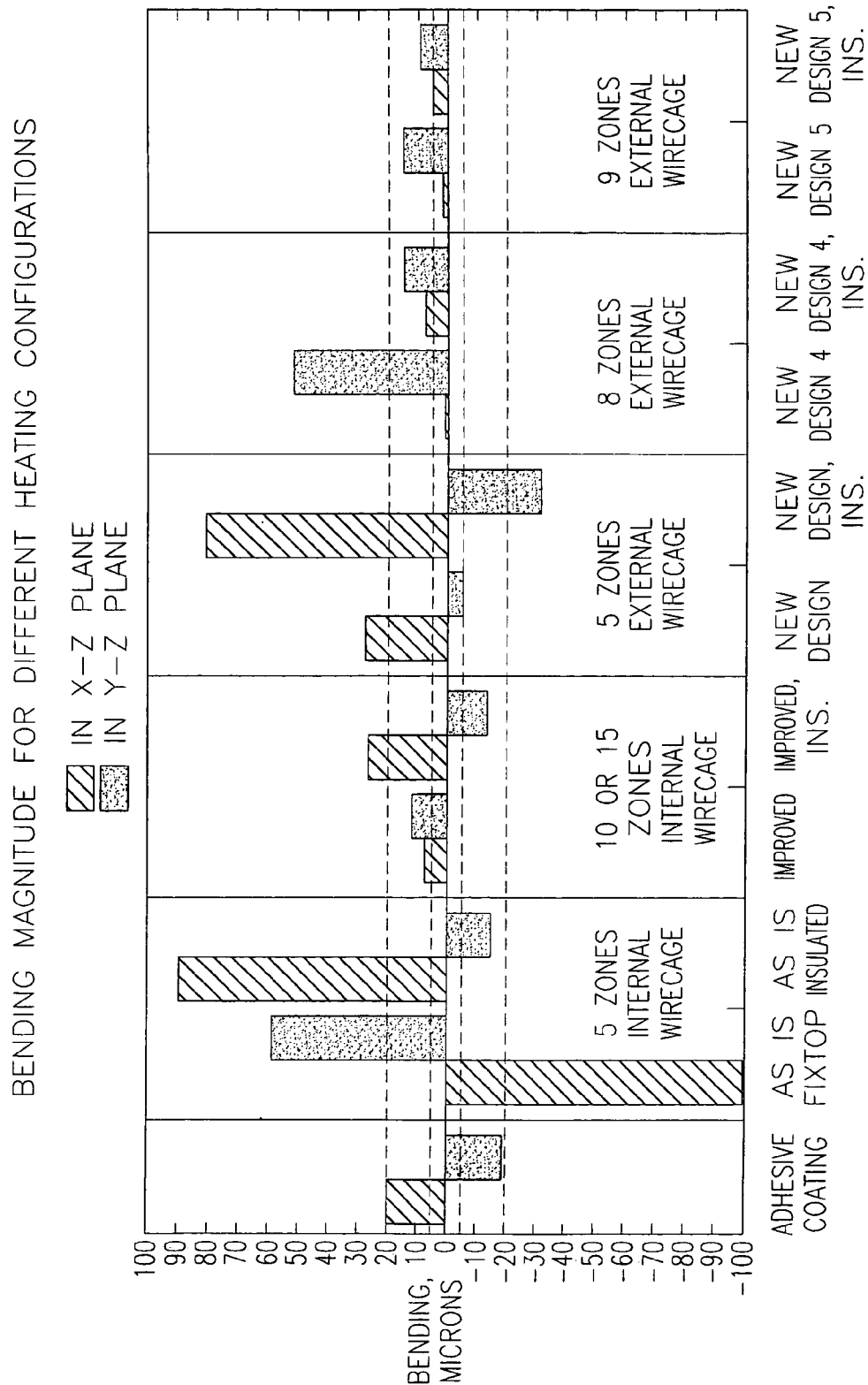
FIG. 6 shows a graph of bending magnitudes for different heating configurations.

Referring now to FIG. 6, an example of a die bending magnitude comparison for a progression of different die and die heating thermal zone and geometry configurations (each having heaters and temperature sensors, with internal or external wirecages) is depicted. This illustrative study uses a simple criteria (with or without maximum practical surface insulation) to test the thermal-dimensional stability of the design progression. The outer lines along the FIG. 6 x-axis are reference lines showing the thickness of a typical coating, e.g., +−20 microns. The inner dotted lines along the x-axis are also additional reference lines showing machining tolerance for die cold, e.g., the lip face to be ground flat to be within 8–10 microns. The cross-hatched bars depict the bending of the coating lips in the X-Z plane. The dotted bars depict the bending of the die lip in the Y-Z plane. This data is helpful to determine needed changes in the heating configuration and die geometry, such as possibly needing to add heaters to certain locations in the die, and determining temperature sensor locations.

Figure 7:
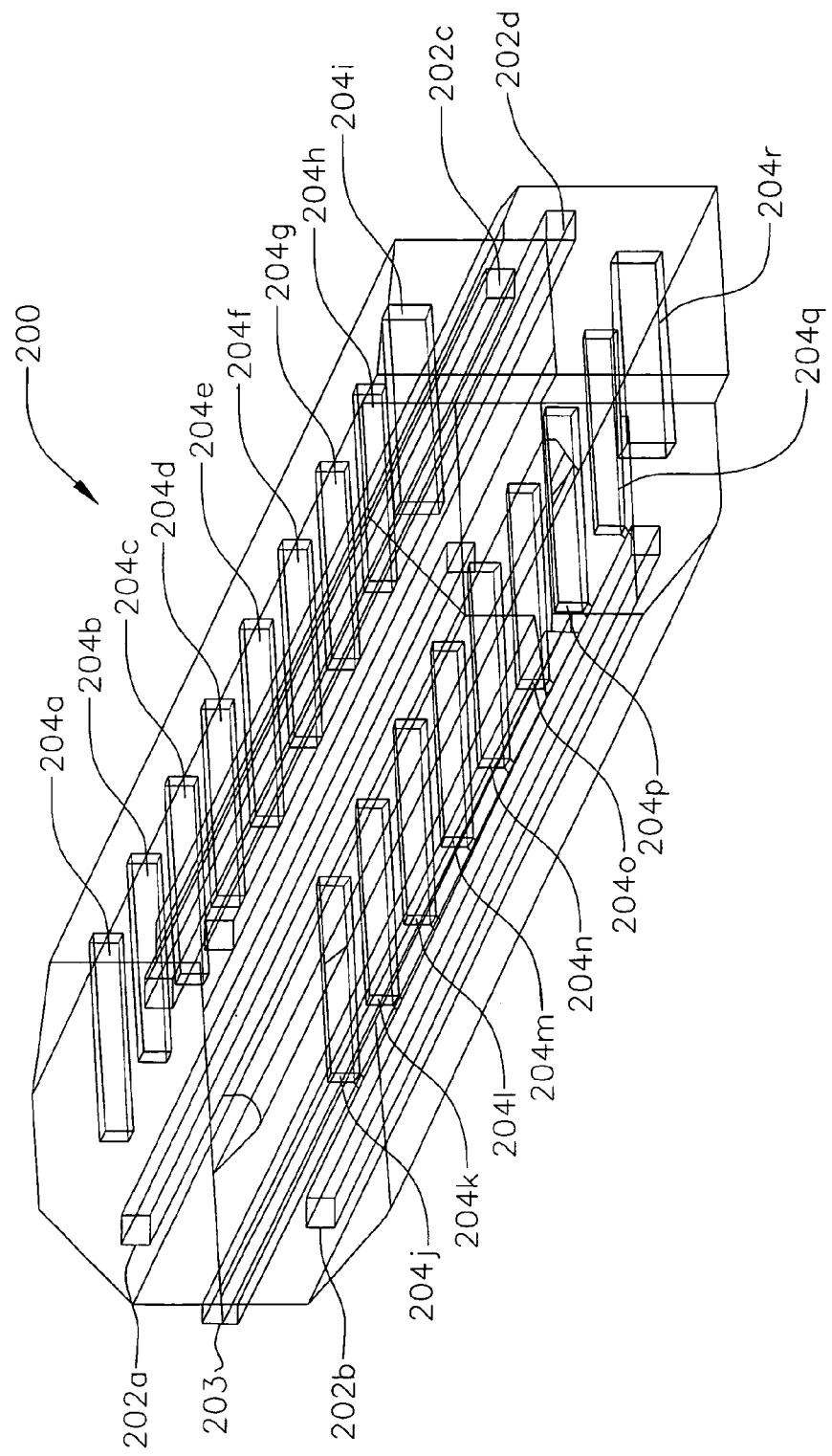
FIG. 7 shows an exemplative solid model with heaters in place.

Referring to FIGS. 7–9, an exemplative die design involving a fixed top hot melt slot die to minimize bending at the coating lips face in accordance with the present inventive process is set forth. In FIG. 7 there is depicted solid model 200 with heaters in place. The heaters are modeled as rectangular slots to simplify the model. Heaters $202a$–$202d$ run longitudinal across the width of the die. Heaters $204a$–$204r$ run back to front, the front having the coating lips, partially across the die.

To develop the appropriate heat distribution to meet die design objectives, temperatures in a number of representative cross-sections of the die are examined. Referring now to FIG. 8, there is depicted a thermal map with temperature legend of a representative cross-section of a fixed top die 210, having coating lips 212, front wall 213, front wall taper 215, and a pair of front to back heaters $214a$, $214b$. Fluid manifold 216 provides fluid to coating gap 218. Temperature distributions are depicted as spanning a 50° F. range from thermal areas identified as 12 (maximum heat) to 6 (medium heat) to 1 (minimum heat) and therebetween. As can be seen, the temperature gradient is cool in rear area 220, hot in the areas near heaters $214a$, $214b$ and somewhat medium heat at coating lips 212. Therefore, with such a die configuration the rear will tend to contract and the front will tend to expand and the die will tend to bend concaved toward the back.

Referring to FIG. 9, when die 210 of FIG. 8, for example, has it's geometry adjusted and longitudinal heaters added a thermal map of an improved fixed top die 230 will result. Fixed top die 230 has coating lips 232, front wall 234, front wall taper 236, a pair of front to back heaters $238a$, $238b$, and three longitudinal heaters $240a$, $240b$ and $240c$. Fluid manifold 242 provides fluid to coating gap 244. As in FIG. 8, thermal gradients are depicted as spanning a 50° F. range from thermal areas identified as 12 (maximum heat) to 6 (medium heat) to 1 (minimum heat) and therebetween. As can be seen the temperature is uniform and the gradient is small throughout most of the die which will help prevent undesirable bending. This is a result of both geometry design changes, i.e., wire cages moved external to the die, die shortened, unneeded material removed, the addition of longitudinal heaters, $240a$, $240b$ and $240c$, and with the movement of front to back heaters $238a$, $238b$ of die 230 being moved closer to the die exterior than that of front to back heaters $214a$, $214b$ of die 210.

Referring now to FIGS. 10–15$b$, exemplary embodiments of die apparatus and their heating system developed in accordance with the present invention is now described in more detail.

The heating system for the die is typically composed of heat sources (electrical resistance heaters, oil, steam, or other types of heating and cooling sources), temperature sensors (such as thermocouples, resistance temperature detectors, thermistors, or other types of temperature sensors), and thermal insulation and isolation materials, electrical interconnection hardware (if electrical heat is used and for sensors signals), fluid distribution devices (if oil, steam or other fluids are used), etc.. The heating system is developed concurrently with the die geometry to gain maximum benefit from both.

As an example, the operating criteria for a Tool Steel die (such as AISI P-20 Tool Steel) and its heating system can include:

(1) To operate in a manner which maintains the X-Z bending flatness of the die lips to less than 0.001" flatness deviation, preferably less than 0.0005" deviation. This is as measured with a mechanical or optical gage on a precision granite table.

(2) To operate in such a manner which maintains the Y-Z flatness of the lip faces to less than 0.004" flatness deviation, preferably to less than 0.002" deviation. This is as measured with a mechanical or optical gage on a precision granite table.

(3) To not change the magnitude of lip flatness deviation in the X-Z or Y-Z planes more than 0.001" when coating commences, preferably less than 0.0004". This is as demonstrated by finite element modeling or other means.

(4) To allow controlled bending of the die at least in the X-Z plane. Bending shall be 0.0005"–0.003" per 1° F. offset between rear and front of the die (starting from the flat state of point 1) in the X-Z plane for the unconstrained die of the approximate configuration described here. This is as measured with a mechanical or optical gage on a precision granite table.

(5) To maintain cross-width temperature deviation in the slot of less than 15° F., preferably less than 8° F., with the adhesive temperature at or near the nominal temperature of the die. This is as determined by finite element modeling, and verified with surface temperature measurements at or near the lip faces.

The operating criteria for a tool steel die in the preceding paragraphs are applicable to a die with a width to X-dimension distance ratio up to 11 or a width to Y-dimension distance ratio up to 14 and a steady state operating temperature of up to 200° C. In all cases, any width to X-dimension distance ratio and/or width to Y-dimension ratio greater than 2.5 and steady state operating temperatures greater than 200° C. are also possible, but the achievable requirements may change. Other die configurations can be designed, but achievable requirements may change. Other materials may be considered, but the achievable requirements may change based upon the thermal and physical properties of the material. Other means of determining flatness may be used, including strain gages, or other stress/strain measurement techniques. All of these changes can be considered within the methodology outlined.

The die heating system heaters described herein are classified as "cross-sectional", "cross-width", or both. Cross-sectional heaters are those heaters which have a substantial effect on the X-Z and Y-Z flatness or bending. Cross-width heaters are those heaters which are have a substantial effect on the temperature distribution across the width of the die (Z-direction). Heaters can be both cross-sectional and cross-width. Heater refers to any active heat (or cooling) source. These are collectively referred to as active heat transfer means.

X-Z flatness is the most critical, since it directly translates into the thickness of the coating. Y-Z flatness is less critical as long as the substrate is close to flat relative to the size of the feed gap (i.e., coating on a large diameter roll, i. e. 16", with a small feed gap, i.e., 0.020" is an approximately flat surface). Normally, the die is optimized for X-Z plane bending, then checked in the Y-Z plane for acceptability; though the Y-Z plane bending state is explicitly optimized in the design methodology. Cross-width temperature variability is critical to the rheology of the fluid, but with respect to the present invention, it is considered mainly in relation to its interaction with the cross-sectional portion of the heating system.

Figure 10:
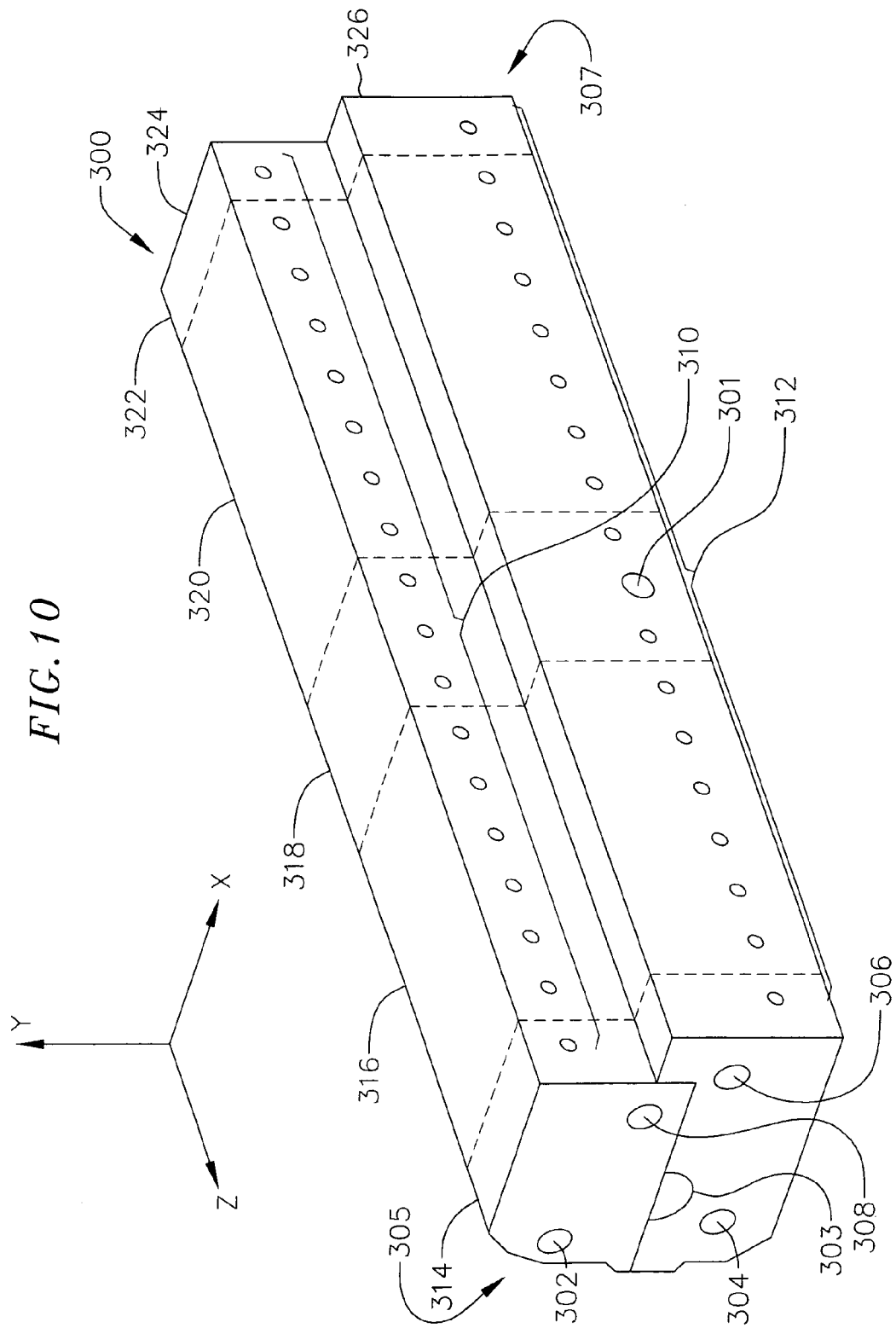
FIG. 10 shows schematically a simplified die apparatus in accordance with the present invention.

FIG. 10 shows schematically simplified die 300 with heaters. Die 300 includes fluid inlet 301 which communicates with internal longitudinal fluid trough coupled to fluid inlet 301 in a T-shaped manner (not shown) to allow the fluid to be dispensed across the width of the die. Fluid trough opening 303 at the width extremes are capped/gasketed (not shown) to prevent fluid emerging from the respective width ends of the die.

In order to maintain bending flatness in the X-Z plane, heaters are inserted into cavities in the front end 305 and/or rear end 307 of the die. Heaters that heat the front and rear of the die are deemed front cross-sectional heaters and rear cross-sectional heaters, though in some instances they may also function as cross-width heaters. The two heaters 302, 304 are front heaters, each being a single heater running longitudinally through the width of the die. These heaters each typically have a single associated temperature sensor for feed back to regulate their power. These heaters could be made cross-width by placing separately controlled zones within them, or by replacing the single heater with multiple small individual heaters grouped into multiple zones, and in either case, adding a temperature sensor and control loop for each zone.

Heater 306 and optional heater 308 are rear cross-sectional heaters. They are analogous to front heaters 302,304 and also run longitudinally through the width of the die.

Heater groups 310, 312 are a plurality of individual heaters grouped into separate cross-width die zones 314, 316, 318, 320, 322 and may be inserted into cavities into the front and/or rear of the die. In the depicted embodiment of FIG. 10, heater groups 310 and 312 are inserted into cavities in the rear of the die. Being cross-width heaters, and in this case due to their length and placement, they mainly affect the rear of the die. As such, they can also be considered cross-sectional heaters. A temperature sensor associated with cross-width heaters in a particular cross-width die zone is placed in a location as to be more sensitive to the rear heating than the front heating in order to assure this effect.

In the case of the cross-width heaters for this simplified example, the zoning is such that there are independently controlled zones 314, 322 for the ends (to minimize end losses), independently controlled zone 318 for the center (to accommodate fluctuating fluid inlet temperatures, and independently controlled main heater zones 316, 320 (between ends and center). In one embodiment, die top half 324, while structurally attached, is zoned independent of die bottom half 326 for more cross-sectional (Y-Z) flatness control.

Simplified FIGS. 11a–11e are shown in a representative X-Y plane cross-section to describe the interrelation between cross-sectional and cross-width heaters. In these figures, the front and rear heaters are longitudinal heaters, and the cross-width heaters are appropriately zoned individual heaters, with a single cross-width heater from the respective groups being shown. Typical die rear to front distance is 5–10". Typical die thickness of top or bottom is 2–4".

Figure 11A:
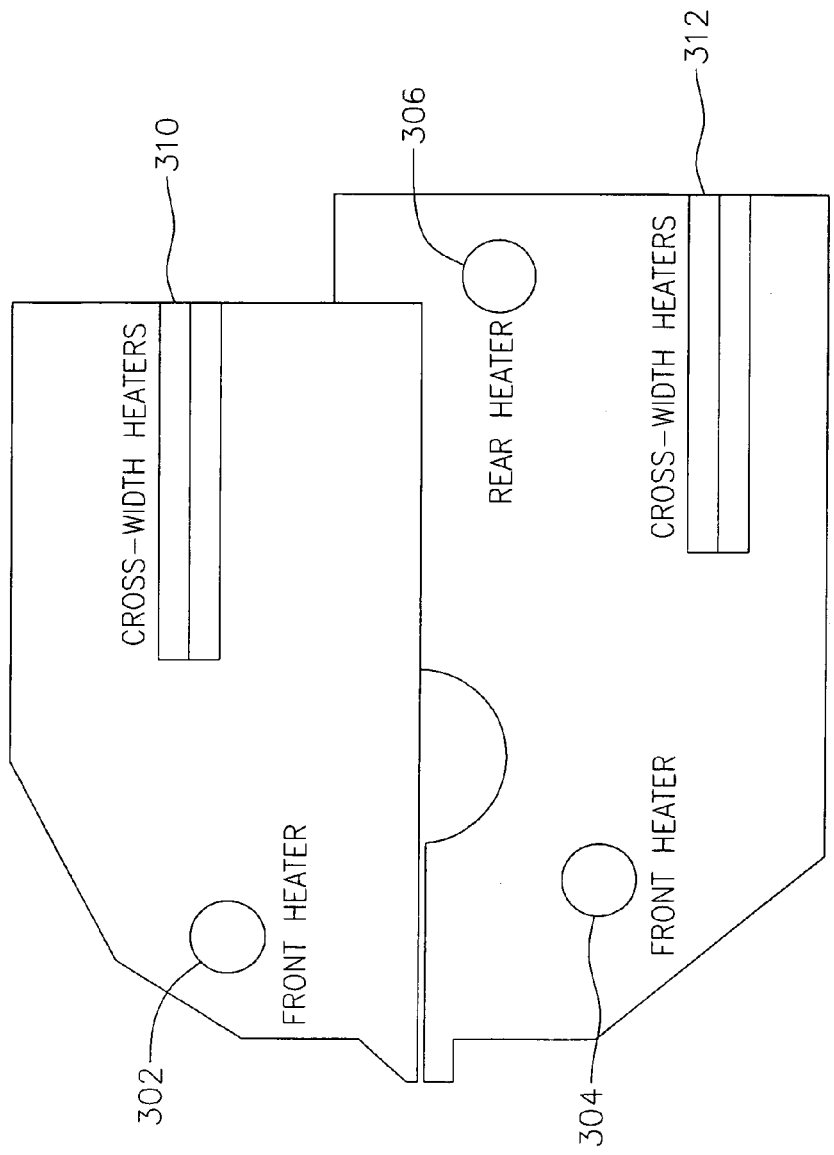
FIGS. 11a–11e show in representative X-Y plane cross-section various die apparatus embodiments in accordance with the present invention.
Figure 11B:
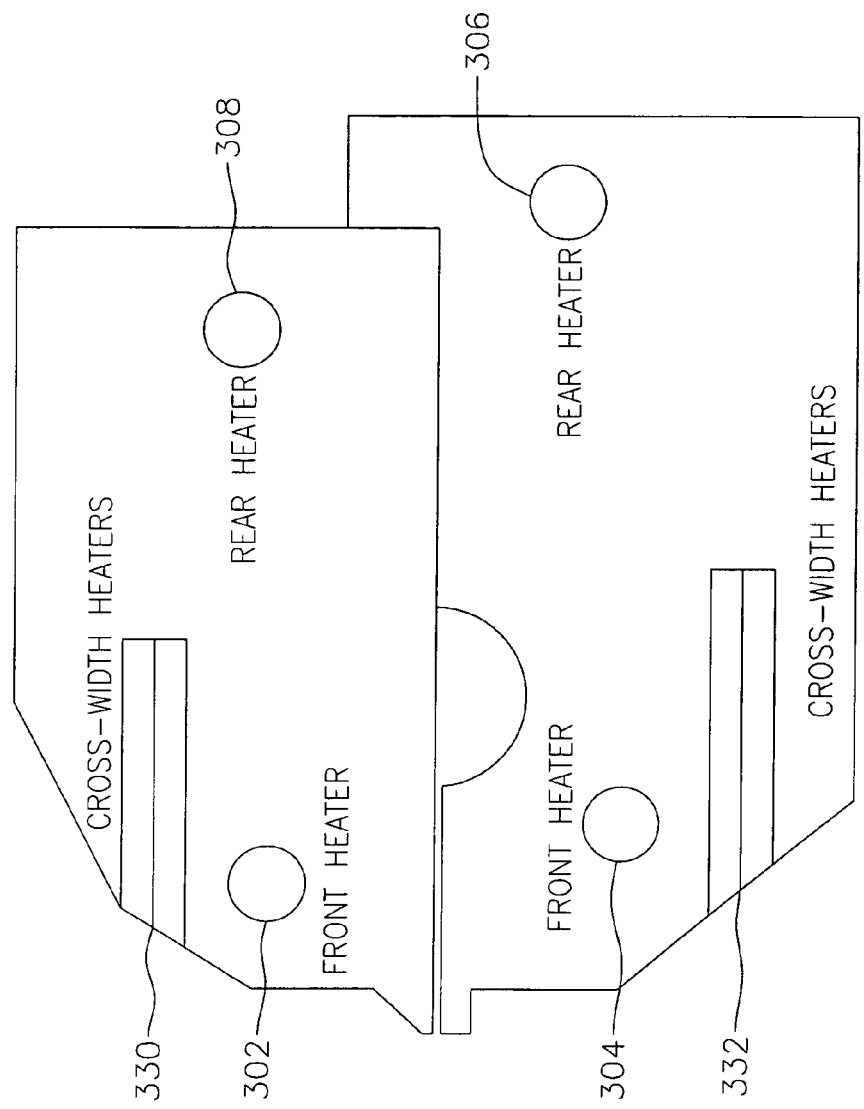
Figure 11C:
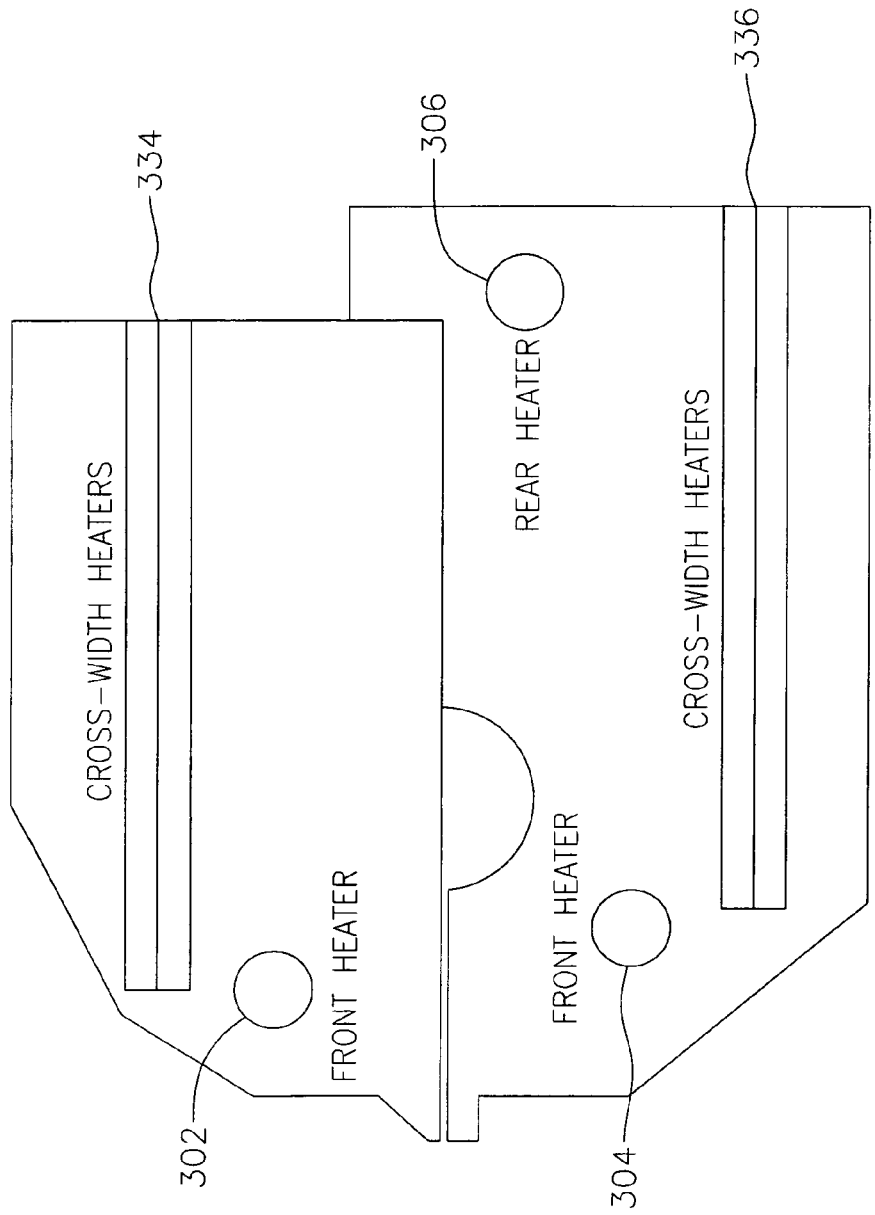
Figure 11D:
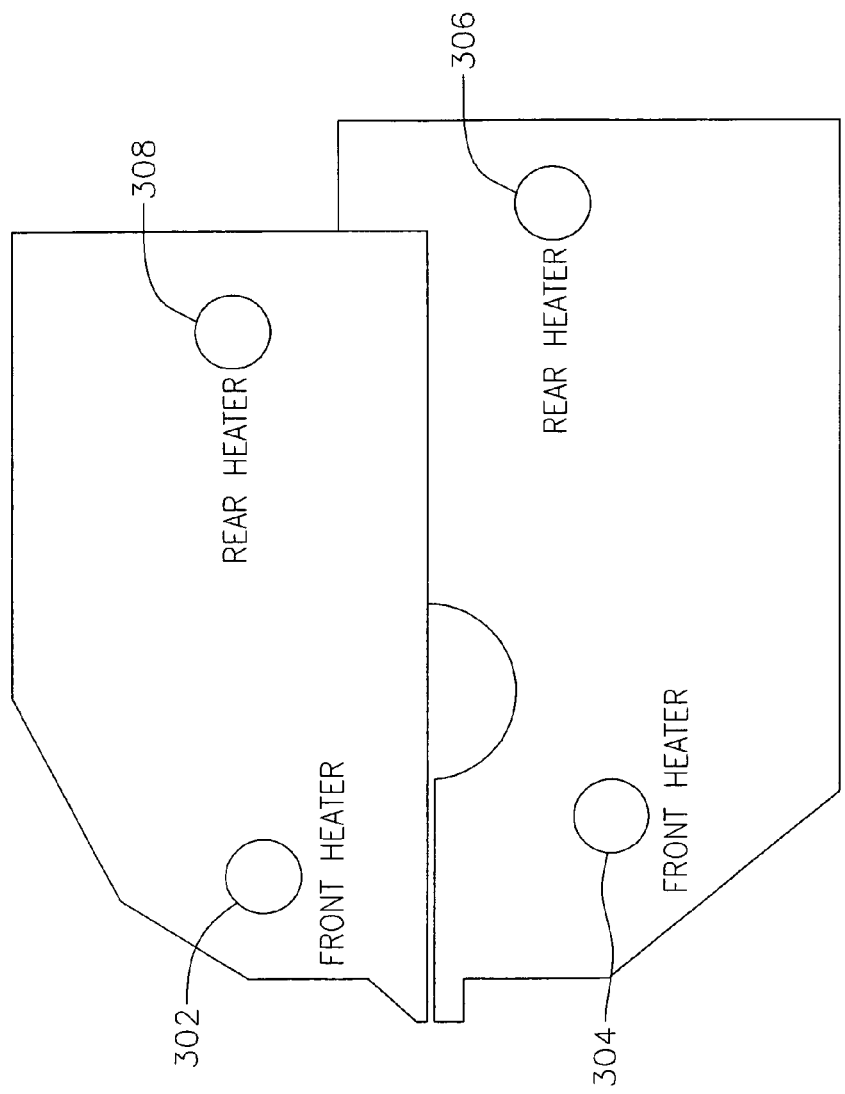

FIG. 11a illustrates a die which has two front longitudinal heaters 302, 304, one rear longitudinal heater 306, and cross-width heaters 310, 312 which are also cross-sectional heaters (rear heating). FIG. 11b shows a non-typical but possible configuration where cross-width heaters 330, 332 are also front cross-sectional heaters. This is generally not done, but is possible. FIG. 11c illustrates a situation similar to FIG. 11a, except cross-width heaters 334, 336 significantly extend across the back to front direction of the die. In this case, the cross-width heaters usually do not act as cross-section heaters. FIG. 11d is a die with no specific cross-width heaters, though as mentioned previously, independent zones could be manufactured into the longitudinal heaters.

Figure 11E:
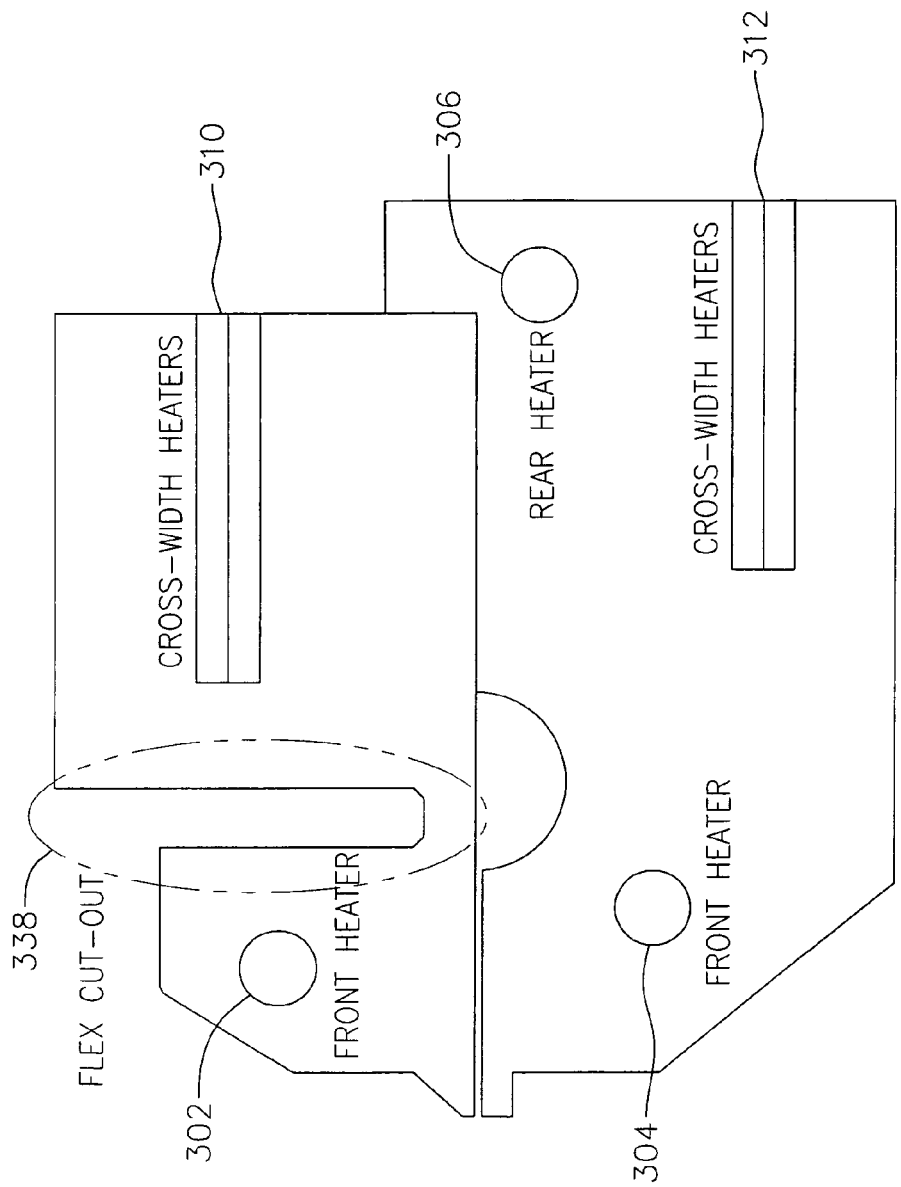

All the dies illustrated in FIGS. 11a–11d are referred to as fixed top dies, meaning the feed gap is fixed and determined by machining of the die halves. Referring now to FIG. 11e, the die shown is similar to the die depicted in FIG. 11a, but with section 338 of metal cut out of the front top half to form a flex top section. Various mechanisms could be put in place to allow the flex top section to be bent locally to modify the feed gap. From a thermal perspective, in FIGS. 11a–11d, there is free heat flow between the front and rear (as well as top and bottom) of the dies. In FIG. 11e, there is free communication between the front and rear of the bottom half, but not in the top half. The front of the top half is effectively partitioned from the rear of the top half. There is some heat flow, but it is limited by the thickness of steel in flex section 338. In general, for the exemplary embodiments of FIGS. 11a and 11e, the cross-width heaters are rear cross-sectional heaters.

Figure 12:
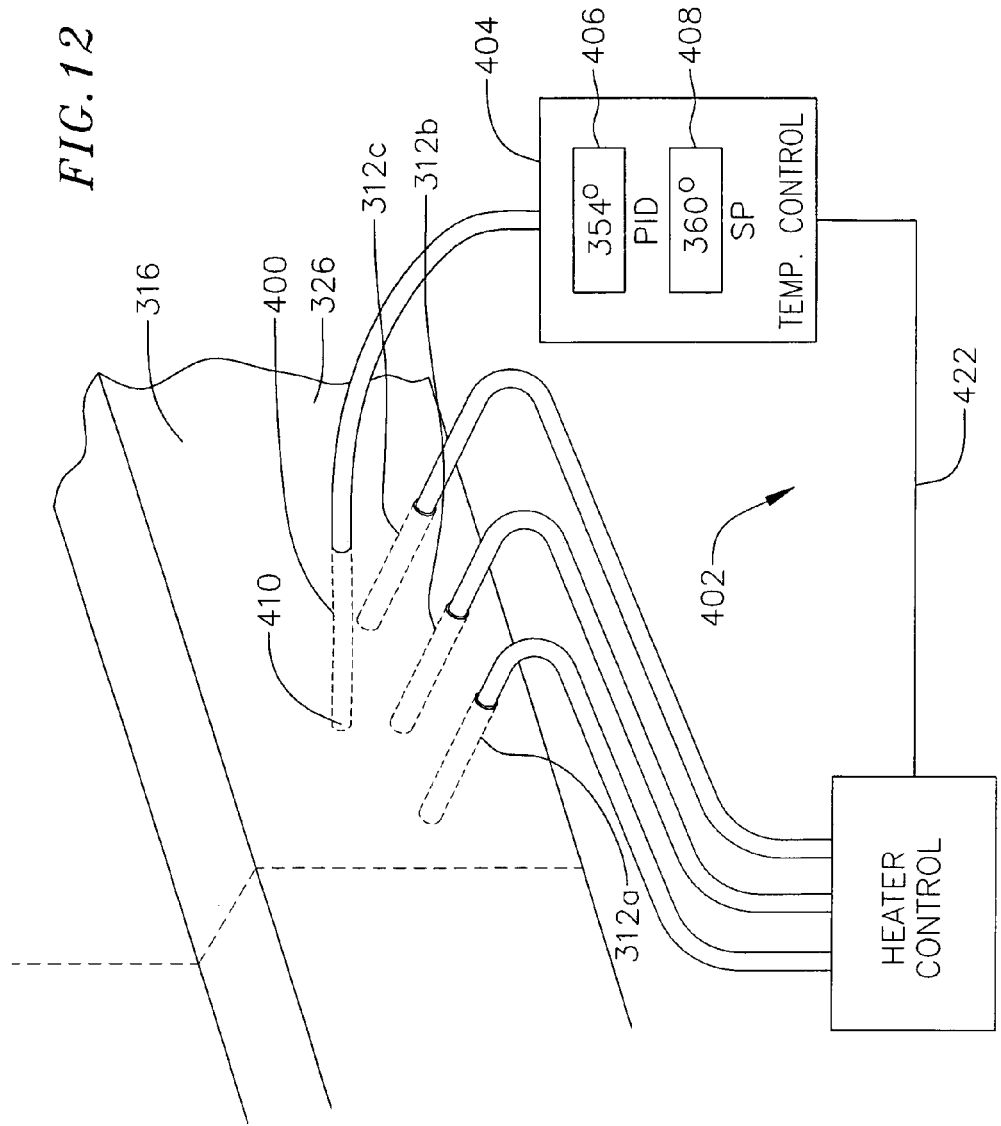
FIG. 12 depicts a portion of a die apparatus embodiment in accordance with the present invention in conjunction with the operation of its cross-width heating and control system.

Referring now to FIG. 12, a portion of zone 316 of die bottom half 326 and representative three heaters 312a, 312b, 312c of the heater group 312 of FIG. 10, is shown in conjunction with main zone temperature sensor 400 and related heating and control system 402.

Each zone has a zone temperature sensor associated with the heaters (both cross-width heaters and cross-sectional heaters) in the particular zone. The sensor sends sensed temperature data to a proportional integral derivative (PID) temperature controller which compares the sensed temperature data with a temperature set point. If the comparison shows that the sensed temperature is below the temperature set point, the PID controller will signal the heaters to increase power. If the comparison shows that the sensed temperature is greater than the temperature set point, the PID controller will signal the heaters to decrease power. Accordingly, these zone temperature sensors are used in effect to control the die cross-width temperature. Each zone temperature sensor is located in the die in a centralized proximity to the heaters to be controlled in its zone.

Referring again to FIG. 12, main zone temperature sensor 400, which in one embodiment can be a resistance temperature detector (RTD) with sensing tip 410 installed in a tube which is inserted and supported at a convenient orientation within die bottom half 326 through a preformed sensor channel or drilled hole in the die. The sensor is located to meet predetermined temperature criteria. These locations can vary accordingly. For example, in the design methodology, temperature sensor locations (for a tool steel die with width to X-dimension distance ratio and/or width to Y-dimension distance ratio greater than 2.5, operating at least up to 200° C. in room air) could be chosen for each zone which meet the following conditions as determined by finite element modeling:

(1) the sensing tip of all temperature sensors (all zones) are within 1° F., preferably less than 0.2° F. of the nominal die temperature, which is within 10° F., and preferably 2° F. of the entering fluid temperature. Condition (1) is met when fluid is not flowing through the die (for visually setting the coating gap, measuring flatness, etc.). Condition (1) is met while fluid within 2° F., and up to 10° F. of the nominal die temperature is flowing through the die at up to maximum flow rate.

(2) local temperature gradients in the region of the sensing tip, where possible, are less than 5° F. per inch, and preferably less than 1° F. per inch.

The location of heaters and sensors within a specific die geometry are such that these requirements are met while meeting the previously-mentioned requirements (1)–(5), possibly after small temperature offsets are determined by measurement. Sensor 400 reads the die temperature 406 at its location and provides the sensed temperature data to temperature controller 404 which has a predetermined desired zone temperature set point 408. Temperature controller 404 performs a comparison between the measured die temperature and the set point temperature and sends temperature differential control signal 420 to heater control 422, such as a relay mechanism which allows current to flow to respective resistive heaters. When the sensed die temperature and set point temperature are the same current flow to the heaters remains constant.

In addition there can be front top, front bottom, rear top and rear bottom temperatures sensors meeting the above-criteria. These sensors are used to control the die cross-section temperature. These sensors would be located in the die in a centralized proximity to the cross-section heaters in the respective front-top, front bottom, rear top and rear bottom longitudinal cross-section heaters.

Figure 13:
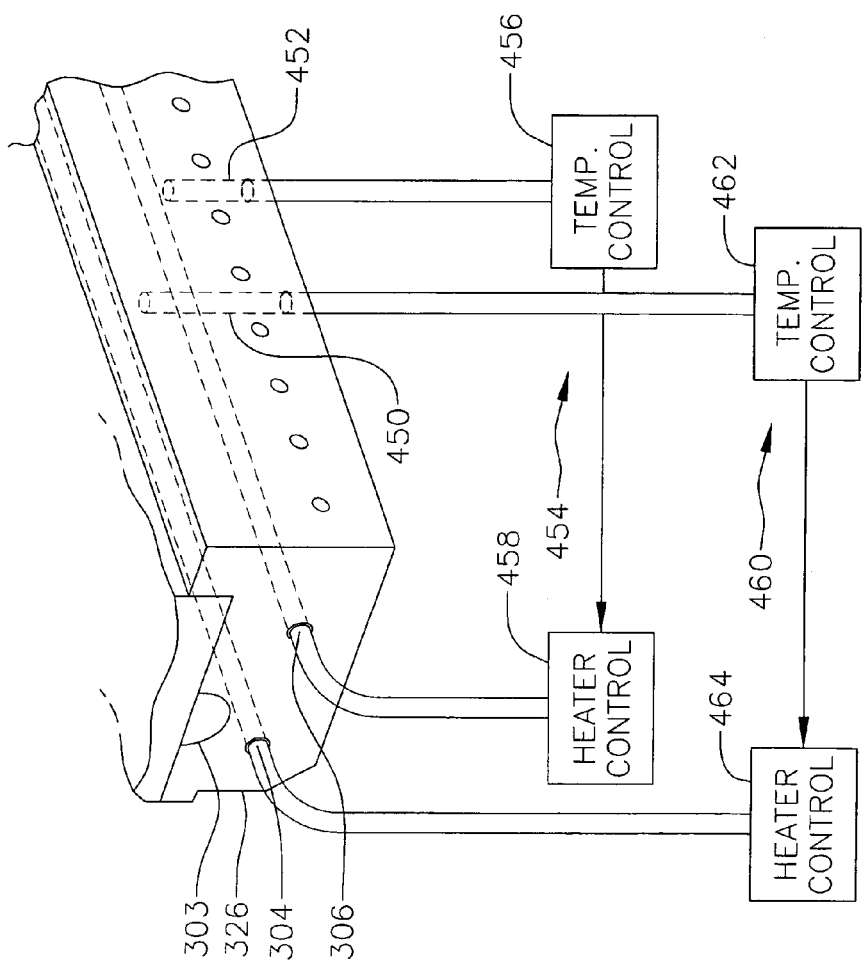
FIG. 13 depicts a portion of a die apparatus embodiment in accordance with the present invention in conjunction with the operation of its cross-section heating and control system.

Referring now to FIG. 13, as an example of cross-section heaters and their heater control, a portion of the end of die bottom half 326 and a representative three heaters 304, 306 of FIG. 10, is shown in conjunction with their respective longitudinal temperature sensors 450, 452 and related respective heating and control circuitry 454, 456. Fluid trough opening 303 is shown exposed in FIG. 13 but would normally be sealed as described above. Each cross-section heater has its own sensor and related heating and control system. For example, front bottom cross-section heater 304 extends across the width of die bottom 326 and has an associated front bottom temperature sensor 450 which is coupled to front bottom heating and control system 460. Heating and control system 460 includes temperature control 462 and heater control 464. Similarly, rear bottom cross-section heater 306 extends across the width of bottom die 326 and has an associated rear bottom temperature sensor 452 which is coupled to rear bottom heating and control system 454. Heating and temperature control system 454 includes temperature control 456 and heater control 458. Both front bottom heating and control system 460 and rear bottom heating and control system 454 operate in a similar manner to that previously disclosed with regard to heating and control system 402 of FIG. 10. The sensors 450 and 452 are located in a location determined by finite element modeling to meet the previous criteria, e.g., along the length of the heater in proximity to their respective heaters 304, 306, typically 0.5" from their respective heater, such that their associated set points can provide for controlling the front and back temperatures to be the same.

Each of the sensors, whether sensors for cross-section heaters or cross-width heaters are also located also that cross-talk from other sensed areas is minimized, whether associated with other cross-section heating areas or other cross-width heating zones.

Each of the respective heating and control systems for both the cross-width and the cross-section heaters will then cycle their respective system feedbacks such that all the sensors across the entire die are at the same temperature. Once heater and sensor locations are properly chosen for a given die geometry with all expected attachments and heat losses, and all the die areas are at the same temperature, the die can be deemed flat for the stipulated operating conditions.

Figure 14:
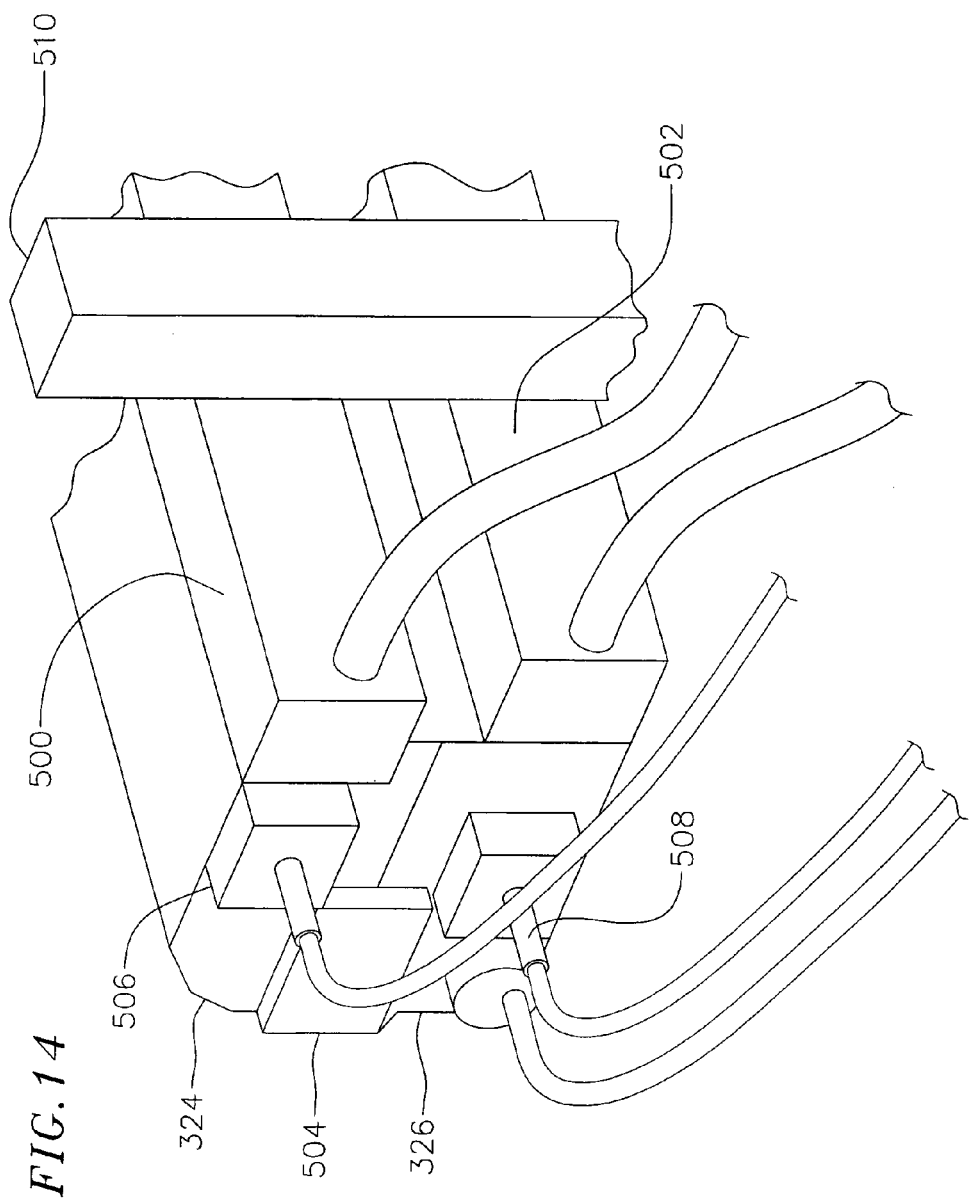
FIG. 14 shows a further portion of a die apparatus embodiment in accordance with the present invention in conjunction with further attachments affecting overall temperature distribution within the die.

Referring now to FIG. 14, a partial portion of the die shown in FIG. 10 having a top die portion 324 and bottom die portion 326 is shown with further attachments which may affect the overall temperature distribution in the die. Top die portion 324 has affixed to the rear portion thereof wirecage 500 which can collect the various cross-width heater wirings associated with the top die portion. Similarly, bottom die portion 326 has affixed to the rear portion thereof wirecage 502 which can collect the various cross-width heater wirings associated with the bottom die portion. The end of the die includes gasket plate 504 to seal the end of the fluid trough. Top and bottom die cross-sectional and/or cross-width sensor wirings can run longitudinally (such as in a formed die channel) and terminate in respective connector housings 506, 508. Mounting blocks, such as block 510 can be coupled to the die and allow the die assembly to mountably sit into a die station housing structure adjacent to the die (not shown).

However, it should be understood that the present top and bottom die combination may be thermally isolated from any such die station housing adjacent to the die. As such, the present inventive method and apparatus is directed to an integrated main heating system for the heated die and is not concerned primarily with the heat loss associated with the die station housing. Preferably, any heating of the fluid to bring it to its proper temperature for application on the substrate is done separately from the heaters of the present invention as much as possible. Needless to say, the heat convected by the heated fluid as it passes through the die from fluid inlet and out through the coating lips will effect the overall die temperature distribution.

Figure 15A:
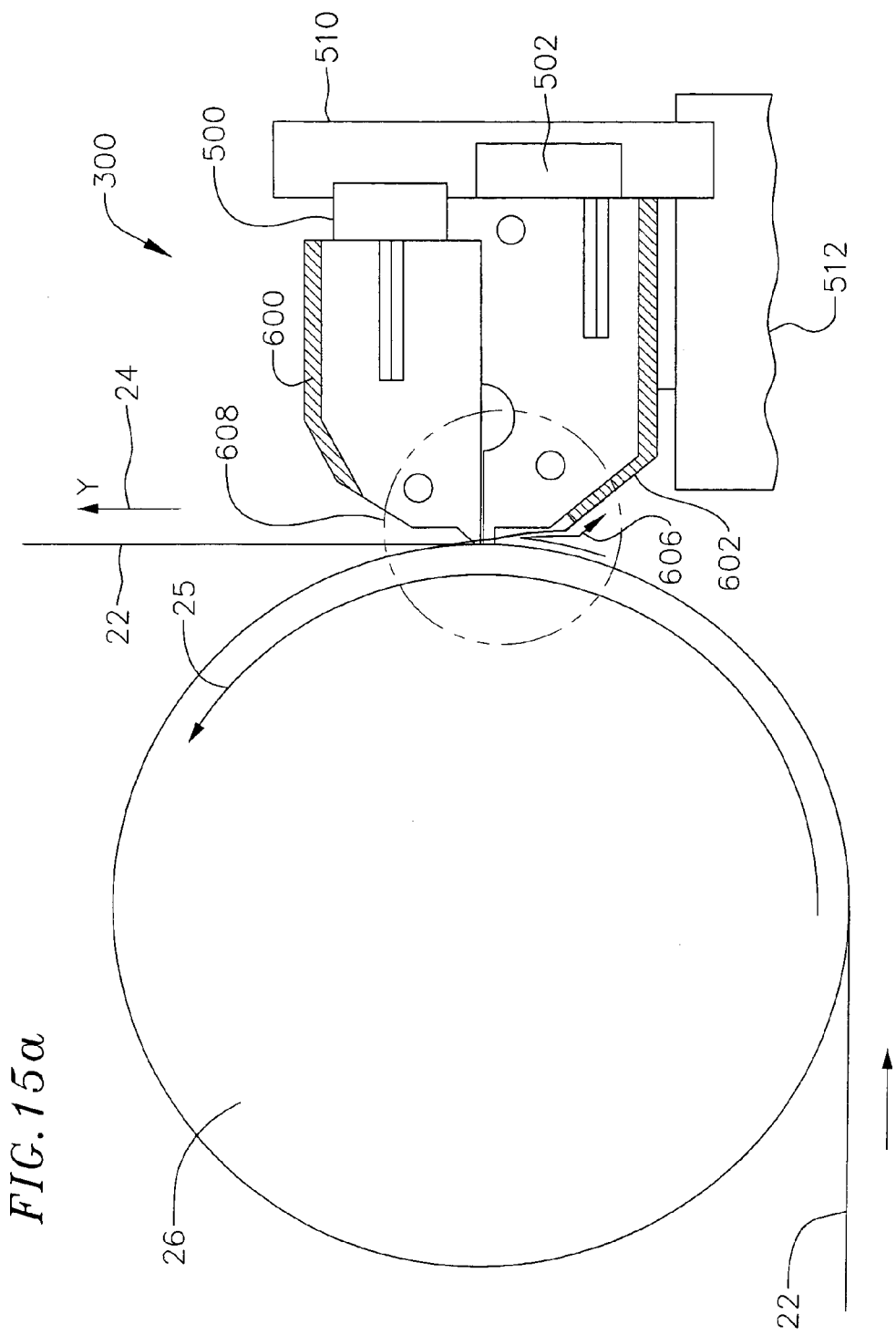

Referring now to FIGS. 15a and 15b (which is a blow-up of a portion of FIG. 15a), there is shown schematically in simplified cross-section, a further embodiment of the present invention. As can be seen, substrate 22 travels in Y direction 24 as back-up roll 26 rotates in direction 25. Die 300 includes thermal insulators 600, 602 on the top and bottom surfaces of die 300 and wind guard 604 which deflects in direction 606 wind produced by rotation of back-up roll 26. The air flow guard protects the front lower portion of the die from localized cooling due to stripping of an air boundary layer from the substrate. Area 608 is depicted in FIG. 15b. Also seen are wirecages 500, 502 and mounting block 510 fitting into die station housing 512. The modeling process in accordance with the present invention takes into account the various features of the die and these attachments thereto which can affect the temperature distribution within the die.

The front cross-section heaters generally provide 20%–60% of the total applied heating power of the die, depending on actual heater placement and sensor locations. In the exemplary configuration, they tend to run 25%–45%. This is based on actual power output of the temperature controllers. Rear heaters (plus any optional small auxiliary heaters) run most of the balance (including cross-width heaters). Front and rear longitudinal heaters generally are located such that their centers are less than 1.5" from the outside surface closest to them. Cross-width heaters generally start from the rear of the die and extend towards the front 3–6".

These configurations are the exemplary embodiments since most of the various items attached to the die tend to be attached at the rear, leading to more heat loss variation there. End heaters can be placed such that they heat the entire end.

In the exemplary embodiments, wire wound platinum resistance temperature detectors (RTDs) pre-screened for an accuracy of better than +−1° F., or preferably better than 0.4° F. at a target temperature (i.e., 346° F.) are used. In this case, replacement will not significantly effect the bending state of the die. Also, drift of wire wound platinum RTD's are known to be very small over time. High accuracy PID temperature controllers could include, but not be limited to Syscon RKC SR Mini HG System.

A further exemplary implementation could be as follows:

(1) Operate the front heaters such that they (and thus the slot and manifold) are at nominal temperature. The coating will enter the die at or near this nominal temperature.

(2) In actual measurements of flatness after the die is manufactured, if any offsets to set points for cross-sectional zones in the heating system (due to uncertainties in the finite element modeling which led to heater and sensor locations) are needed to bring the die to within the measured flatness specification, make them at the rear of the die if possible. This is so: (a) the temperatures of the slot and manifold, which are dominated by the front heaters, will stay at the temperature of the adhesive and thus corrections to bending will have minimal effect on the rheology of the fluid; and (b) Since the fluid typically enters at the center of the rear of the die, the heat transfer to a higher or lower temperature will be minimal since the thermal conductivity of materials coated in these dies is typically very low, and the distance from the metal wall to center of the tube is typically significant; conversely in the front of the die, the fluid is spread to a thin film (typically less than 0.060") with a large heat transfer area, thus heat transfer rates are much higher.

(3) These offsets may be necessary because: (a) the thermal and structural finite element models have uncertainties in them. This can lead to uncertainty in the cross-sectional and/or cross-width temperature distribution. Coupling this with using a single temperature sensor to establish a temperature for a single zone (i.e., the rear zone), can lead to a shift in actual temperature measured at the sensor from what was originally predicted. It has been demonstrated that once the shift is corrected, the die is stable. (b) Attachments to the die, such as metallic wire cages (to house heater and/or sensor wires) can interact with the die and each-other in complex ways, often difficult to model correctly (especially in terms of radiation heat transfer and airflow modification), adding to uncertainty in local temperature distributions near the attachment points. (c) Depending on how the die is machined and stress relieved, direction-preferential stresses may exist which are not easily accounted for by finite element modeling. The offset between the maximum and minimum cross-section heating zone setpoints should not exceed 10° C., and preferably should not exceed 4° C.

(4) Insulate the die as much as possible from attachments and isolate it from any external mounting structure to minimize the existence of local hot or cold spots, which complicate the ability to accurately predict temperature distributions, leading to uncertainties in choosing heater and sensor locations. Also, consider insulating large surfaces to minimize heat loss by convection to air, and reduce radiation heat losses; thus reducing temperature gradients near these surfaces. Where possible, place an insulating layer between die surfaces and any metal attachment. Where the die is mounted to its support structure, use structural insulating materials to isolate the die from heat loss to the mounting structure. Use of insulation on large surfaces can be helpful in minimizing sensitivity to environmental conditions. Use some type of shield to the front bottom (and optionally top) of the die to deflect high velocity air carried by the substrate from cooling the front of the die. FIGS. 15a and 15b shows such a shield (wind guard), plus a possible insulating strategy. Overall, minimize the number and magnitude of effects that a given heater zone needs to accommodate (i.e., convection heat loss, attachment heat loss, interaction with fluid, etc.). The more effects, and the larger the magnitude, the greater the possibility of compromise and sensitivity to different operating conditions. Isolate the die from heat loss when mounting it. This means the heating system only has to deal with losses to the atmosphere, and limited losses to attachments.

Those skilled in the art can appreciate that alternative embodiments to those described and shown in the figures can fall within the scope of the present invention. For example, referring back to FIG. 2b, those skilled in the art can appreciate that the inventive concepts described in conjunction with FIGS. 10–15b can be applied to the multiple section die in FIG. 2b. Cross-section heaters, cross-width heaters and their associated sensors can be modeled and located as appropriate for die sections 50a, 52a and 52b of FIG. 2b.

The invention claimed is:

1. A method of structuring a thermally stable coating die apparatus having a Z-dimension die width distance to X-dimension die distance and/or Z-dimension die width distance to Y-dimension die distance ratio greater than 2.5 and a steady state operating temperature, the die apparatus including a die having a die geometry including die lip faces in Y-Z planes and a slot opening perpendicular to the lip faces in an X-Z plane, active heat transfer means, temperature and/or heat flux sensors, to provide flat die lip faces under die operating conditions, the method comprising:

maintaining a nominal state of bending flatness of the die lip faces in the X-Z plane to less than a defined flatness deviation and not changing the magnitude of die lip flatness deviation in the X-Z plane or Y-Z planes more than a defined flatness deviation when coating commences, while balancing the heating system to minimize temperature gradients in the X-Z plane and/or Y-Z planes for a predictable amount and direction of bending in the respective plane, using one or more of die geometry, placement of the active heat transfer means, placement of temperature or heat flux sensors, shielding from operating conditions, heat transfer and structural numerical modeling, statistical analysis, temperature or heat flux, dimensional, strain and/or stress measurement techniques, die functionality, minimum increment of temperature measurement and control accuracy related to minimum acceptable deviation from flatness, coating die material of construction relative to thermo-structural material properties, and desirable coating die material properties.

2. The method of claim 1, wherein the Z-dimension die width distance to X-dimension die distance ratio is up to 11 and the Z-dimension die width distance to Y-dimension die distance ratio is up 14, the operating temperature is up to 200° C., and the material of construction is steel, and further comprising maintaining bending flatness of the die lip faces in the X-Z plane to less than 0.001" flatness deviation, while not changing the magnitude of lip flatness deviation in the X-Z plane or Y-Z planes more than 0.001" when coating commences, and having an ability to purposefully bend the die in the X-Z plane at a rate of 0.0005" to 0.003" per 1° F. of purposefully induced temperature gradient in the X-Z plane.

3. The method of claim 2, further comprising maintaining die bending flatness in the Y-Z planes to less than 0.004" flatness deviation.

4. The method of claim 3, wherein bending flatness in the Y-Z planes is maintained to less than 0.002" flatness deviation.

5. The method of claim 2, further comprising maintaining cross-width temperature deviation in the slot opening of less than 15° F., with the adhesive temperature being at the nominal temperature of the die, or within 10° F. thereof.

6. The method of claim 5, wherein cross-width temperature deviation in the slot opening is maintained less than 8° F., with an adhesive temperature being at a nominal temperature of the die, or within 2° F. thereof.

7. The method of claim 2, wherein bending flatness of the die lip faces in the X-Z plane is maintained to less than 0.0005" flatness deviation, while not changing the magnitude of lip flatness deviation in the X-Z plane or Y-Z planes more than 0.0004" when coating commences.

8. The method of claim 2, wherein the operating conditions include die insulation, air flow, and insensitivity of the heating system to presence or lack thereof of fluid flow in the die.

9. The method of claim 2, further comprising placing heaters longitudinal to the lip faces to provide controllable heating for managing and eliminating temperature gradients.

10. The method of claim 9, further comprising locating heaters placed longitudinally to the lip faces to interact with heaters placed cross-width to collectively control and minimize temperature gradients.

11. The method of claim 2, further comprising placing heaters in heating zones as needed to minimize or eliminate local temperature gradients.

12. The method of claim 2, further comprising insulating the die apparatus to reduce or eliminate temperature gradients.

13. The method of claim 2, further comprising using an air flow guard to protect a front lower portion of the die from localized cooling due to stripping of an air boundary layer from the substrate.

14. The method of claim 2, further comprising using high accuracy temperature sensors to minimize temperature measurement uncertainties.

15. The method of claim 2, further comprising controllably balancing die temperatures to manage the bending state.

16. The method of claim 2, further comprising using electrical heaters or fluid such as oil, water, steam, or other heating or cooling means and mechanical devices capable of promoting heat transfer.

17. The method of claim 2, further comprising simplifying the die geometry to remove unneeded material which lead to hot and/or cold spots such that all structurally important portions of the die which remain are adaptable to being heated and or insulated from heat loss and being temperature monitored.

18. The method of claim 17, further comprising placing heaters in the die to allow uniform controlled heating of the entire die.

19. The method of claim 18, further comprising placing heaters longitudinal to the die lip faces.

20. The method of claim 19, further comprising placing temperature sensors in die locations which accurately indicate the temperature state of heater zones which the temperature sensors monitor.

21. The method of claim 20, wherein the temperature sensors are resistance temperature detectors.

22. The method of claim 17, further comprising simplifying die geometry and heater and temperature sensor placement by numerical heat transfer model calculations, wherein thermal deformation is estimated by mapping the temperature results onto a numerical structural model, the thermal and structural models being run taking into account process variations.

23. The method of claim 22, wherein the process variations include fluid flowing through the die and or air flow around the die.

24. The method of claim 1, wherein the die operating conditions include die insulation, air flow, and insensitivity of the heating system to presence or lack thereof of fluid flow in the die.

25. The method of claim 1, further comprising placing heaters longitudinal to the lip faces to provide controllable heating for managing and eliminating temperature gradients.

26. The method of claim 25, further comprising locating heaters placed longitudinally to the lip faces to interact with heaters placed cross-width to collectively control and minimize temperature gradients.

27. The method of claim 1, further comprising placing heaters in heating zones as needed to minimize or eliminate local temperature gradients.

28. The method of claim 1, further comprising insulating the die apparatus to reduce or eliminate temperature gradients.

29. The method of claim 1, further comprising using an air flow guard to protect a front lower portion of the die from localized cooling due to stripping of an air boundary layer from the substrate.

30. The method of claim 1, further comprising using high accuracy temperature sensors to minimize temperature measurement uncertainties.

31. The method of claim 1, further comprising controllably upsetting the temperature balance to manage the bending state.

32. The method of claim 1, further comprising using electrical heaters or fluid such as oil, water, steam, or other heating or cooling means and mechanical devices capable of promoting heat transfer.

33. The method of claim 1, further comprising simplifying the die geometry to remove unneeded material which lead to hot and/or cold spots such that all structurally important portions of the die which remain are adaptable to being heated and or insulated from heat loss and being temperature monitored.

34. The method of claim 33, further comprising placing heaters in the die to allow uniform controlled heating of the entire die.

35. The method of claim 34, further comprising placing heaters longitudinal to the die lip faces.

36. The method of claim 35, further comprising placing temperature sensors in die locations which accurately indicate the temperature state of heater zones which the temperature sensors monitor.

37. The method of claim 36, wherein the temperature sensors are resistance temperature detectors.

38. The method of claim 33, further comprising optimizing geometry simplification and heater and temperature sensor placement by numerical heat transfer model calculations, wherein thermal deformation is estimated by mapping the temperature results onto a numerical structural model, the thermal and structural models being run taking into account process variations.

39. The method of claim 38, wherein the process variations include fluid flowing through the die and or air flow around the die.

40. A method for structuring a thermally stable coating die having a Z-dimension die width distance to X-dimension die distance and/or Z-dimension die width distance to Y-dimension die distance ratio greater than 2.5 and a steady state operating temperature, the method comprising:
providing a die configuration having die lip faces in a Y-Z front portion plane and a slot opening perpendicular to the die lip faces in an X-Z plane;
providing a heating system for the die configuration, the heating system having active heat transfer means and temperature sensors; and
determining locations within the die configuration for both the active heat transfer means and the temperature sensors by balancing the heating system to minimize temperature gradients in the X-Z plane and/or Y-Z front portion plane for an amount and direction of bending in a respective plane and provide a nominal state of bending flatness of the die lip faces in the X-Z plane to be less than a defined flatness deviation while not changing the magnitude of die lip flatness deviation in the X-Z plane or Y-Z planes more than a defined flatness deviation when coating commences.

41. The method of claim 40, wherein providing a die configuration includes providing a heat transfer and structural numerical model based upon die functionality characteristics, minimum increment of temperature measurement and control accuracy related to minimum acceptable deviation from flatness, coating die material of construction relative to thermo-structural material properties, desirable coating die material properties, and shielding from operating conditions.

42. The method of claim 40, wherein providing a die configuration includes optimizing die configuration geometry and active heat transfer means and temperature sensor placement by numerical heat transfer model calculations, wherein thermal deformation is estimated by mapping temperature results onto a numerical structural model.

43. The method of claim 40, wherein providing a die configuration includes simplifying the die configuration to remove unneeded material which lead to hot and/or cold spots such that portions of the die configuration which remain are adaptable to being heated and/or insulated from heat loss and temperature monitored.

44. The method of claim 40, wherein balancing the heating system includes:
locating one or more front cross-section heaters spaced within the die configuration longitudinally across the die width and proximate to the Y-Z front portion plane, each front cross-section heater being optionally a top front cross-section heater and/or a bottom front cross-section heater and having a respective front cross-section temperature sensor, each front cross-section temperature sensor being coupled to a front cross-section temperature control system to regulate heat being applied by the respective front cross-section heaters;
locating one or more rear cross-section heaters spaced within the die configuration longitudinally across the die width and distal to the Y-Z front portion plane, each rear cross-section heater being optionally a top rear cross-section heater and/or a bottom rear cross-section heater and having a respective rear cross-section temperature sensor, each rear cross-section temperature sensor being coupled to a rear cross-section temperature control system to regulate heat being applied by the respective rear cross-section heaters, the one or more front cross-section heaters and the one or more rear cross-section heaters being set to operate at a steady state operating temperature; and balancing the one or more front cross-section heaters and the one or more rear cross-section heaters to minimize temperature gradients along the width in the X-Y plane for maintaining bending flatness of the coating lip faces in the X-Z plane to be less than a defined flatness deviation while not changing the magnitude of die lip flatness deviation in X-Z plane or the Y-Z front portion plane more than a defined flatness deviation when coating commences.

45. The method of claim 44, wherein balancing the heating system includes changing:

a temperature difference between front cross-section heaters and rear cross-section heaters by modifying a ratio of heating power applied to front cross-section heaters to heating power applied to rear cross-section heaters for controlling bending of the die in the X-Z plane; and/or a temperature difference between top cross-section heaters and bottom cross-section heaters by modifying a ratio of heating power applied to top cross-section heaters to heating power applied to bottom cross-section heaters for controlling bending of the die in the Y-Z front portion plane.

46. The method of claim 40, wherein the Z-dimension die width distance to X-dimension die distance ratio is up to 157, the Z-dimension die width distance to Y-dimension die distance ratio is up to 14, the operating temperature is up to 200° C., and the material of construction is steel, and further comprising balancing the heating system includes maintaining bending flatness of the die lip faces in the X-Z plane to less than 0.001" flatness deviation, while not changing the magnitude of lip flatness deviation in the X-Z plane or Y-Z planes more than 0.001" when coating commences, and optionally bending the die configuration in the X-Z plane at a rate of 0.0005" to 0.003" per 1° F. of purposefully induced temperature gradient in the X-Z plane.

47. The method of claim 40, further comprising balancing the heating system to maintain die bending flatness in the Y-Z front portion plane to less than 0.004" flatness deviation.

48. The method of claim 40, further comprising balancing the heating system to maintain cross-width temperature deviation in the slot opening of less than 15° F. for an adhesive temperature being at a nominal temperature of the die configuration.

49. The method of claim 40, further comprising balancing the heating system to maintain cross-width temperature deviation in the slot opening to be less than 8° F. for an adhesive temperature at a nominal temperature of the die configuration.

50. The method of claim 40, further comprising balancing the heating system to maintain bending flatness of the die lip faces in the X-Z plane to be less than 0.0005" flatness deviation while not changing the magnitude of lip flatness deviation in the X-Z plane or Y-Z front portion plane more than 0.0004" when coating commences.

51. The method of claim 40, further comprising balancing the heating system to maintain bending flatness in the Y-Z front portion plane to be less than 0.002" flatness deviation.

52. The method of claim 40, further comprising insulating the die configuration to reduce or eliminate temperature gradients.

53. The method of claim 40, further comprising using an air flow guard to protect a front lower portion of the die configuration from localized cooling due to stripping of an air boundary layer from the substrate.

54. The method of claim 40, wherein the temperature sensors are resistance temperature detectors.

* * * * *